United States Patent
Shimmitsu et al.

(10) Patent No.: US 10,318,212 B2
(45) Date of Patent: Jun. 11, 2019

(54) CONTROL DEVICE AND STORAGE SYSTEM

(71) Applicant: FUJITSU LIMITED, Kawasaki-shi, Kanagawa (JP)

(72) Inventors: Masaru Shimmitsu, Kawasaki (JP); Mikio Ito, Kawasaki (JP); Osamu Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 15/226,431

(22) Filed: Aug. 2, 2016

(65) Prior Publication Data
US 2017/0052738 A1 Feb. 23, 2017

(30) Foreign Application Priority Data
Aug. 19, 2015 (JP) .................. 2015-161594

(51) Int. Cl.
*G06F 3/06* (2006.01)
(52) U.S. Cl.
CPC .......... *G06F 3/0685* (2013.01); *G06F 3/0611* (2013.01); *G06F 3/0625* (2013.01); *G06F 3/0634* (2013.01); *G06F 3/0647* (2013.01); Y02D 10/154 (2018.01)
(58) Field of Classification Search
CPC .... G06F 3/0685; G06F 3/0611; G06F 3/0625; G06F 3/0634; G06F 3/0647
See application file for complete search history.

(56) References Cited

U.S. PATENT DOCUMENTS 5,423,046 A * 6/1995 Nunnelley .............. G06F 1/206
713/330
2006/0015529 A1 1/2006 Yagawa
2008/0104339 A1 5/2008 Nakagawa et al.
(Continued)

FOREIGN PATENT DOCUMENTS

JP 2002-304353 10/2002
JP 2006-31668 2/2006
(Continued)

OTHER PUBLICATIONS

Japanese Office Action for Japanese Application No. 2015-161594 dated Feb. 19, 2019.

*Primary Examiner* — Ryan Bertram
*Assistant Examiner* — Edmund H Kwong
(74) *Attorney, Agent, or Firm* — Staas & Halsey LLP

(57) ABSTRACT

A control device includes a processor. The processor is configured to receive a write request to write content data. The processor is configured to divide the content data into leading first data and subsequent second data. The processor is configured to write the first data to a first storage resource in a first storage group among a plurality of storage groups having operating rates different from each other. The first storage group has a first operating rate higher than operating rates of any other storage groups. The processor is configured to write the second data to a second storage resource in a second storage group. The second storage group has a second operating rate lower than the first operating rate. The processor is configured to activate, in parallel with the writing of the first data, the second storage resource when the second storage resource is in a non-operating state.

17 Claims, 20 Drawing Sheets

(56) References Cited

U.S. PATENT DOCUMENTS

2008/0276016 A1* 11/2008 Fujibayashi .......... G06F 1/3221
710/36
2010/0017565 A1*  1/2010 Kwon ................... G06F 3/061
711/112
2010/0199035 A1   8/2010 Matsuo et al.
2013/0290598 A1* 10/2013 Fiske ................... G06F 3/0625
711/103

FOREIGN PATENT DOCUMENTS

| JP | 2008-112293 A  | 5/2008 |
| JP | 2009-193628 A  | 8/2009 |
| JP | 2010-0176497 A | 8/2010 |

* cited by examiner

FIG. 4

| STORAGE RESOURCE | TOTAL CAPACITY | FREE CAPACITY | STATUS | ACTIVATION FLAG | TIME SLOT | ACTIVATION TIME | STOP TIME |
|---|---|---|---|---|---|---|---|
| ONLINE_A | 1000 GB | 500 GB | - | - | - | - | - |
| ONLINE_B | 1000 GB | 300 GB | - | - | - | - | - |
| INTERMEDIATE_A | 500 GB | 20 GB | ACTIVATED | ON | 8:00-18:00 | 13 sec | 10 sec |
| INTERMEDIATE_B | 500 GB | 300 GB | STOPPED | OFF | 18:00-8:00 | 15 sec | 12 sec |
| OFFLINE_A | 2000 GB | 500 GB | STOPPED | OFF | 6:00-20:00 | 18 sec | 15 sec |
| OFFLINE_B | 2000 GB | 500 GB | STOPPED | OFF | 20:00-6:00 | 18 sec | 15 sec |
| OFFLINE_C | 1000 GB | 1000 GB | STOPPED | OFF | 0:00-24:00 | 15 sec | 13 sec |

| STORAGE RESOURCE | DETERMINATION INFORMATION | | ONLINE DATA SIZE | ACCESS NUMBER DETERMINATION VALUE | UNIT TIME |
| --- | --- | --- | --- | --- | --- |
| | READ PERFORMANCE | WRITE PERFORMANCE | | | |
| ONLINE_A | 100 MB/s | 80 MB/s | 2300 MB | 156 TIMES | 3600 sec |
| ONLINE_B | 100 MB/s | 90 MB/s | | | |

| CONTENT ID | DATA NAME | DATA SIZE | SUBSEQUENT DATA SIZE | CAPACITY SHORTAGE FLAG |
|---|---|---|---|---|
| 0001 | AAA.bin | 800 MB | - | - |
| 0002 | BBB.bin | 5000 MB | 2700 MB | OFF |
| 0003 | CCC.bin | 3500 MB | 1200 MB | OFF |
| ... | ... | ... | ... | ... |
| 000n | ZZZ.bin | 6000 MB | 3700 MB | ON |

| LEADING DATA RESOURCE | LEADING DATA ADDRESS | SUBSEQUENT DATA RESOURCE | SUBSEQUENT DATA ADDRESS | REARRANGEMENT FLAG | TIME STAMP |
|---|---|---|---|---|---|
| ONLINE_A | 00000aaa | - | - | - | - |
| ONLINE_A | 0000bbbb | INTERMEDIATE_B | 00000XXX | OFF | ... |
| ONLINE_B | 000ccccc | OFFLINE_A | 0000YYYY | ON | 10:00:00.7 |
| ... | ... | ... | ... | ... | ... |
| - | - | OFFLINE_C | 00ZZZZZZ | OFF | ... |

CONTROL DEVICE AND STORAGE SYSTEM

CROSS-REFERENCE TO RELATED APPLICATION

This application is based upon and claims the benefit of priority of the prior Japanese Patent Application No. 2015-161594, filed on Aug. 19, 2015, the entire contents of which are incorporated herein by reference.

FIELD

The embodiment discussed herein is related to a control device and a storage system.

BACKGROUND

For a storage apparatus that stores therein data, there is known a method for reducing electric power consumption of the storage apparatus by stopping, for example, turning off at least one of a plurality of storage devices included in the storage apparatus. Examples of the storage devices include a semiconductor drive device such as a solid state drive (SSD) and a magnetic disk device such as a hard disk drive (HDD).

Related techniques are disclosed in, for example, Japanese Laid-open Patent Publication No. 2006-31668 and Japanese Laid-open Patent Publication No. 2002-304353.

When an access is made to a storage resource, for example, a storage device in a stopped state in a storage apparatus including stopped storage devices, the storage apparatus reactivates the storage device in the stopped state and then performs processing in accordance with an access request, which causes a response delay.

SUMMARY

According to an aspect of the present invention, provided is a control device including a processor. The processor is configured to receive a write request to write content data. The processor is configured to divide the content data into leading first data and subsequent second data. The processor is configured to write the first data to a first storage resource in a first storage group among a plurality of storage groups having operating rates different from each other. The first storage group has a first operating rate higher than operating rates of any other storage groups among the plurality of storage groups. The processor is configured to write the second data to a second storage resource in a second storage group among the plurality of storage groups. The second storage group has a second operating rate lower than the first operating rate. The processor is configured to activate, in parallel with the writing of the first data, the second storage resource when the second storage resource is in a non-operating state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an exemplary data structure of a resource management table;

FIG. 5 is a diagram illustrating an exemplary data structure of a determination value management table;

FIG. 6 is a diagram illustrating an exemplary data structure of a content management table;

DESCRIPTION OF EMBODIMENT

Figure 1:
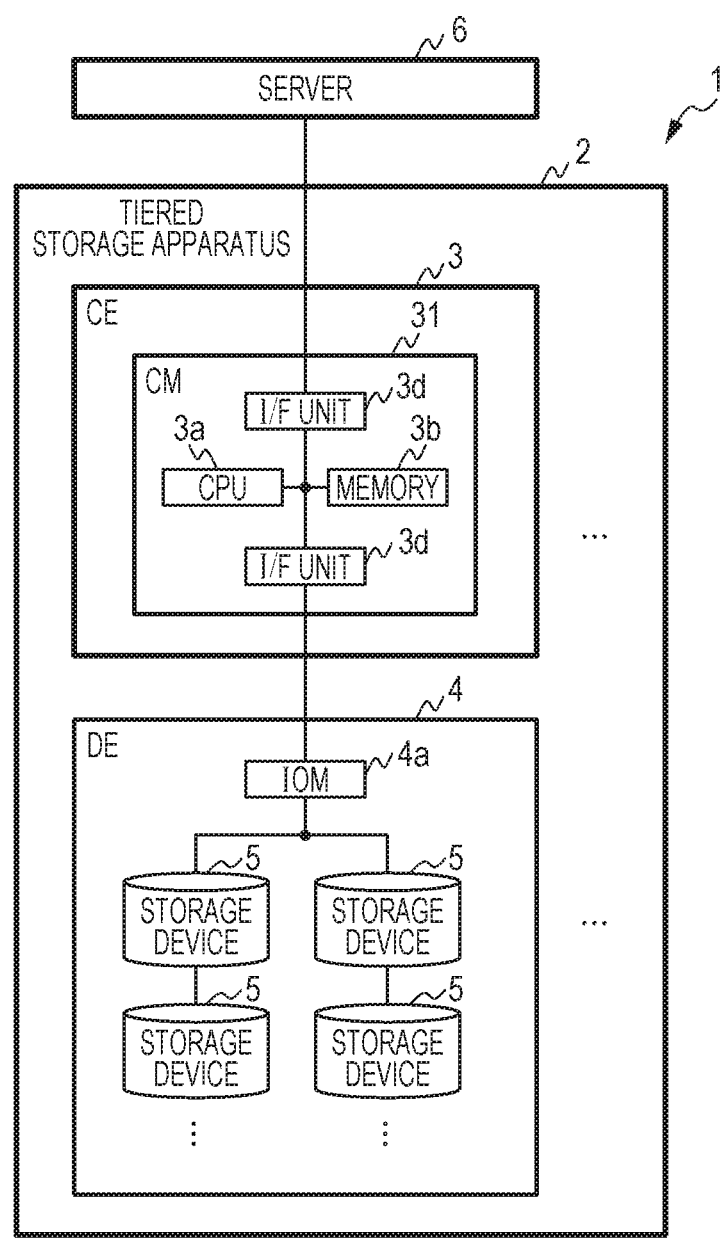
FIG. 1 is a diagram illustrating an exemplary configuration of a tiered storage system according to an embodiment.

An embodiment will be described below in detail with reference to the accompanying drawings. The embodiment described below is merely an example, and is not intended to exclude various kinds of modifications and technical applications not described below. In other words, the present embodiment may be modified without departing from the scope thereof. In the drawings, any components denoted by the same reference numeral are the same or similar with each other unless otherwise stated.

Embodiment

FIG. 1 is a diagram illustrating an exemplary configuration of a tiered storage system 1 according to an embodiment. As illustrated in FIG. 1, the tiered storage system 1 includes, for example, a tiered storage apparatus 2 and a server 6.

The server 6 is an example of a host device that is connected with the tiered storage apparatus 2 through, for example, a network not illustrated and is configured to issue various kinds of access requests to the tiered storage apparatus 2.

The tiered storage apparatus 2 is an example of a storage apparatus including a plurality of storage devices. The tiered storage apparatus 2 has a plurality of storage devices 5 mounted thereon to provide the server 6 with a storage region. For example, the tiered storage apparatus 2 stores data in the storage devices in a distributed or redundant manner using a redundant array of inexpensive disks (RAID), and is capable of providing the host device with a plurality of storage volumes (logical unit number; LUN) based on a RAID group.

As illustrated in FIG. 1, the tiered storage apparatus 2 includes, for example, at least one (in FIG. 1, one) controller enclosure (CE) 3 and at least one (in FIG. 1, one) drive enclosure (DE) 4.

The CE 3 is an exemplary control device configured to control various kinds of accesses, such as reading from or writing to the storage devices 5 included in the DE 4, in accordance with an access request from the server 6.

The CE 3 includes, for example, at least one (in FIG. 1, one) controller module (CM) 31. The CM 31 is an example of an information processing apparatus (computer).

Figure 2:
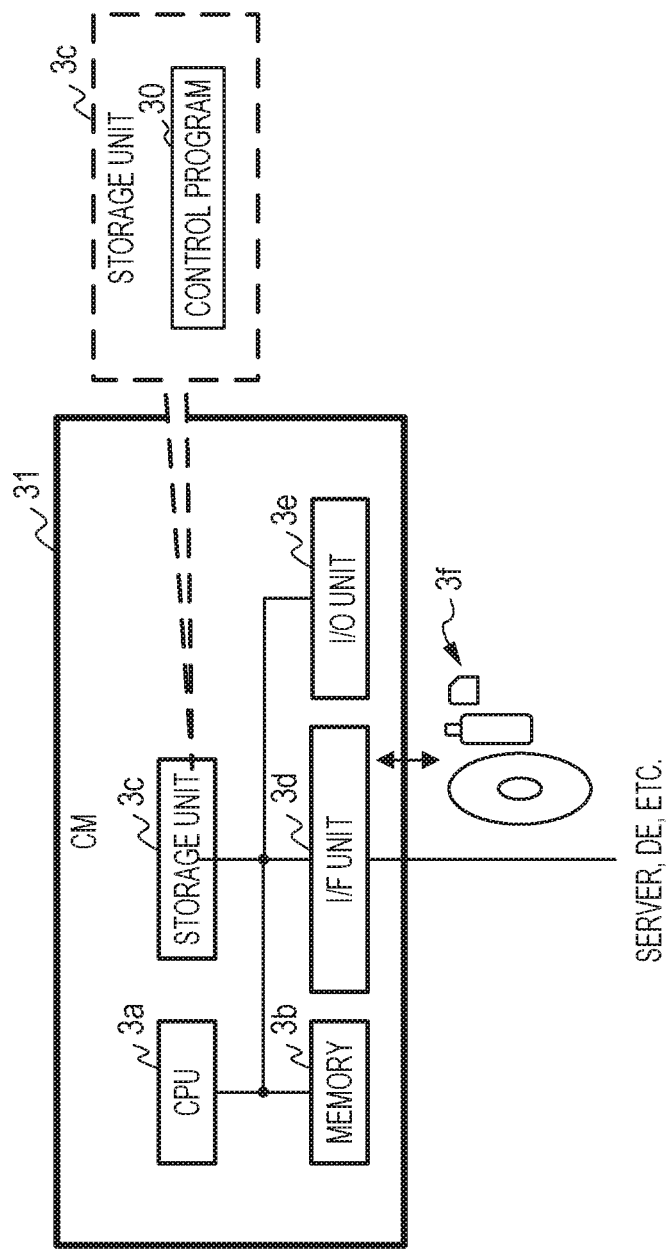
FIG. 2 is a diagram illustrating an exemplary hardware configuration of a CM illustrated in FIG. 1.

As illustrated in FIGS. 1 and 2, the CM 31 includes, for example, a central processing unit (CPU) 3a, a memory 3b, a storage unit 3c, an interface (I/F) unit 3d, and an input and output (I/O) unit 3e.

The CPU 3a is an example of a processor that performs various kinds of control and calculation. The CPU 3a may be communicably connected with each block in the CM 31 through a bus. The processor may be another arithmetic processing apparatus, for example, an integrated circuit (IC) such as a micro processing unit (MPU), in place of the CPU 3a.

The memory 3b is an example of hardware that stores therein various kinds of data and programs. The memory 3b may be used as a cache memory for control of an access to the storage devices 5 at the CM 31. Examples of the memory 3b include a volatile memory such as a random access memory (RAM).

The storage unit 3c is an example of hardware that stores therein various kinds of data and programs. Examples of the storage unit 3c include a magnetic disk device such as an HDD, a semiconductor drive device such as an SSD, and a non-volatile memory such as a flash memory or a read-only memory (ROM).

For example, the storage unit 3c may store therein a control program 30 (refer to FIG. 2) that achieves all or some of various functions of the CM 31. In this case, the CPU 3a may achieve the functions of the CM 31 by loading the control program 30 stored in the storage unit 3c onto the memory 3b and executing the loaded control program 30.

The I/F unit 3d is an example of a communication interface that, for example, controls connection and communication with the server 6, the DE 4, or a management terminal not illustrated. Examples of the I/F unit 3d include a network interface such as a local area network (LAN) card, and an interface compatible with, for example, a storage area network (SAN), a fibre channel (FC), or InfiniBand. In FIG. 1, the I/F unit 3d connected with the server 6 is an example of a channel adapter (CA), and the I/F unit 3d connected with the DE 4 is an example of a device adapter (DA).

The I/F unit 3d may include a reading unit that reads out data and programs recorded in a recording medium 3f. The reading unit may include a connection terminal or device which the computer-readable recording medium 3f is capable of being connected with or inserted into. Examples of the reading unit include an adapter compatible with, for example, a universal serial bus (USB), a drive device that performs an access to a recording disk, and a card reader that performs an access to a flash memory such as a secure digital (SD) card. The recording medium 3f may store therein the control program 30.

The I/O unit 3e includes at least part of an input unit such as a mouse, a keyboard, and an operation button, and an output unit such as a display. For example, the input unit may be used for registration and change of settings by an operator, and various operations such as a mode selection (switching) of the system and inputting of data. The output unit may be used for confirmation of settings by the operator and outputting of various notifications.

The above-described hardware configuration of the CM 31 is merely an example. Thus, addition or removal of hardware (for example, addition or removal of an arbitrary block), separation, integration in arbitrary combination, and addition or removal of a bus may be performed on the CM 31 as appropriate.

In FIG. 1, the DE 4 includes plurality of storage devices 5. The DE 4 includes at least one (in FIG. 1, one) input/output module (IOM) 4a that controls inputting to and outputting from the storage devices 5 in accordance with, for example, an instruction from the CE 3. Examples of the storage devices 5 include a semiconductor drive device such as an SSD and/or a magnetic disk device such as an HDD.

In the example in FIG. 1, the tiered storage apparatus 2 includes one CE 3 and one DE 4, and the CE 3 includes one CM 31, but the present embodiment is not limited thereto. The tiered storage apparatus 2 may include a plurality of CEs 3 and a plurality of the DEs 4, and each CE 3 may include a plurality of the CMs 31.

The following describes an exemplary functional configuration of the tiered storage apparatus 2.

Figure 3:
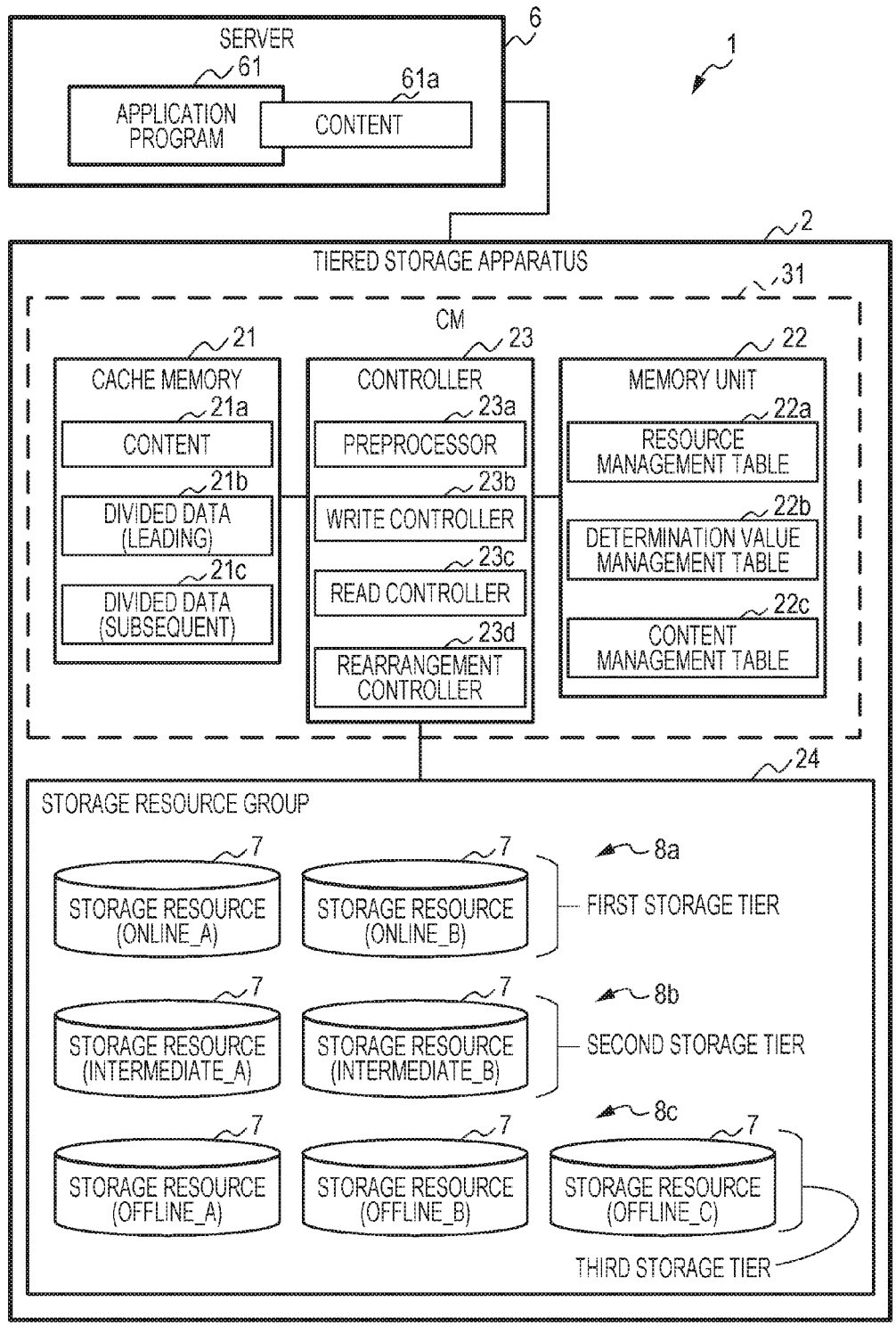
FIG. 3 is a diagram illustrating an exemplary functional configuration of a storage apparatus.

As illustrated in FIG. 3, the tiered storage apparatus 2 includes, for example, a cache memory 21, a memory unit 22, a controller 23, and a storage resource group 24. The controller 23 may be achieved by the CPU 3a by executing the control program 30 stored in the memory 3b. The cache memory 21 and the memory unit 22 may be achieved by, for example, at least part of a storage region of the memory 3b.

The cache memory 21 includes a storage region that temporarily stores therein data (a content 21a, for example) of an access request from the server 6, and temporarily stores therein divided data 21b and 21c related to the content 21a, which is used under control of the controller 23. Hereinafter, the divided data 21b and 21c are also referred to as leading data 21b and subsequent data 21c, respectively.

The content 21a is user data stored in the tiered storage apparatus 2. Examples of the content 21a include: a multimedia file of a still image, a moving image, sound, or a combination of at least one of these; a document file of text, drawing, table, or a combination of at least one of these; and a file achieving a function as a whole such as various kinds of programs. For example, the cache memory 21 may store therein, as the content 21a, a content 61a transmitted from the server 6 by executing an application program 61.

The memory unit 22 includes a storage region that stores therein information on a resource management table 22a, a determination value management table 22b, and a content management table 22c, which is used under control of the controller 23. For sake of simplicity, these tables 22a to 22c are represented in a table format in the following description. In reality, however, these tables 22a to 22c may be treated as information of, for example, arrays in the CM 31. A detailed description of these tables 22a to 22c will be provided in a description of the controller 23.

The controller 23 manages the storage resource group 24 including a plurality of storage resources 7, and performs various kinds of controls on the storage resources 7 in accordance with an access request from the server 6. These controls include division of the content 21a into the divided data 21b and 21c and control of a plurality of storage tiers 8 (8a to 8c) corresponding to different operation modes.

The storage resource group 24 is a collection of the storage resources 7 managed in the tiered storage apparatus 2. The storage resources 7 are each achieved by, for example, at least one of the storage devices 5. The storage resources 7 may be logical volumes, but the storage resources 7 are in different activation states from each other, and thus a storage device 5 included in one of the storage resources 7 is preferably not used in another storage resources 7.

The storage resources 7 are operated in different operation modes, the storage resources 7 labeled with online_A or online_B in the example in FIG. 3 are operating (in a activated state) on a steady basis. The storage resources 7 labeled with intermediate_A or intermediate_B are operating on a steady basis most of time, but are allowed to be stopped when the storage resources 7 is detected to be in a state with no access. The storage resources 7 labeled with one of offline_A to offline_C have rest times longer than those of intermediate_A and intermediate_B. The storage resources 7 labeled with one of offline_A to offline_C are in a stopped state most of time, are activated when accesses are made to them, and are stopped when the accesses are completed.

An operating state (or an activated state) is, for example, a state in which power is supplied (Power-ON) to the storage devices 5 included in a storage resource 7 and an access to the relevant storage resource 7 is possible. A stopped state is, for example, a state in which power supply to the storage devices 5 included in a storage resource 7 is stopped (Power-OFF). In the following description, an activating state refers to a state after power supply to the storage devices 5 has been started in the stopped state until the storage devices 5 are transitioned to the operating state (activated state). A stopping state refers to a state after processing to stop power supply has been started in the operating state until the storage devices 5 are transitioned to the stopped state.

As described above, the tiered storage apparatus 2 hierarchically treats the storage resources 7 of different operation modes in terms of operation states. For example, the storage resources 7 of online_A or online_B are managed as a first storage tier 8a, the storage resources 7 of intermediate_A or intermediate_B are managed as a second storage tier 8b, and the storage resources 7 of one of offline_A to offline_C are managed as a third storage tier 8c. Hereinafter, each of the storage resources 7 of online_A or online_B is also simply referred to as an online storage resource 7, each of the storage resources 7 of intermediate_A or intermediate_B is also simply referred to as an intermediate storage resource 7, and each of the storage resources 7 of one of offline_A to offline_C is also simply referred to as an offline storage resource 7.

In other words, the plurality of storage tiers 8 in the storage resource group 24 are examples of a plurality of storage groups having different operating rates with each other. The first storage tier 8a is an example of a first storage group having an operating rate higher than those of the other storage groups. The second and third storage tiers 8 are examples of a second storage group having an operating rate lower than that of the first storage group.

The online, intermediate, and offline storage resources 7 may have identical or substantially identical performance. Hereinafter, the storage resource group 24 according to the embodiment is assumed to have identical access performance for the online storage resource 7, the intermediate storage resource 7, and the offline storage resource 7.

As illustrated in FIG. 3, the controller 23 includes, for example, a preprocessor 23a, a write controller 23b, a read controller 23c, and a rearrangement controller 23d.

The preprocessor 23a performs preprocessing. The preprocessing may include generation of the resource management table 22a, the determination value management table 22b, and the content management table 22c illustrated in FIGS. 4 to 6. The preprocessing is performed, for example, when the tiered storage apparatus 2 is initially activated, or when a change is made in a device configuration of the tiered storage apparatus 2.

The resource management table 22a is an example of information for managing the storage resource group 24. As illustrated in FIG. 4, each entry of the resource management table 22a includes items of, for example, a storage resource, total capacity and free capacity of each storage resource 7, a status, an activation flag, a time slot, an activation time, and a stop time. The storage resource is information for identifying the storage resource 7 included in the storage resource group 24, and, for example, a storage name is set. The status is set to the activated or stopped state, but may be set to nothing because the online storage resource 7 is activated on a steady basis. The activation flag indicates, when being set to ON, that the relevant storage resource 7 is to be maintained in the activated state even when the relevant storage resource 7 is the intermediate or offline storage resource 7. The time slot is information indicating a time slot in which an access to the relevant storage resource 7 is expected to be made. The interval of the time slot is arbitrary, and may be in units of hours, days, weeks, or months. The activation time is a time taken to activate the relevant storage resource 7 in the stopped state, and the stop time is a time taken to stop the storage resource 7 in the activated state.

As described above, the resource management table 22a is an example of storage information that associates each of the storage resources 7 in the second or third storage group having operating rates different from each other with a duration different from those of the other storage resources 7 in the second or third storage group.

The determination value management table 22b is an example of information for managing a determination value used in control by the controller 23. As illustrated in FIG. 5, each entry of the determination value management table 22b includes items of, for example, a storage resource, a read performance, and a write performance, and determination information including an online data size, an access number determination value, and a unit time. The read performance and the write performance is information indicating the access performance of the relevant online storage resource 7. The online data size is a threshold for determining whether to perform division of the content 21a stored in the online storage resource 7, and is a reference value of the size of the leading data 21b. The access number determination value is a threshold for determining whether to perform rearrangement of the subsequent data 21c between the intermediate storage resource 7 and the offline storage resource 7. The unit time is information used in the rearrangement determination.

The content management table 22c is an example of information for managing the content 21a stored in the storage resource group 24. As illustrated in FIG. 6, each entry of the content management table 22c includes items of, for example, a content identifier (ID), a data name, a data size, a subsequent data size, a capacity shortage flag, leading and subsequent data resources, leading and subsequent data addresses, a rearrangement flag, and a time stamp. The content ID is an example of an identifier for identifying the content 21a.

The data name is a name set to the content 61a received from the server 6. The data size is the entire size of the content 21a, and the subsequent data size is the size of the subsequent data 21c when the content 21a is divided. The capacity shortage flag is a flag indicating that the content 21a is not stored in the online storage resource 7 because of capacity shortage. The leading data resource and the leading data address are information indicating the storage resource 7 that stores therein the entire content 21a or the leading data 21b and the address in the storage resource 7. The subsequent data resource and the subsequent data address are information indicating the storage resource 7 that stores therein the entire content 21a or the subsequent data 21c and the address in the storage resource 7. The rearrangement flag is a flag indicating whether to perform rearrangement of the subsequent data 21c. The time stamp is information for identifying the date and time of an access to the content 21a, and a plurality of pieces of date and time information may be set as the time stamp.

As described above, the content management table 22c is an example of content information indicating storage locations of the leading data 21b and the subsequent data 21c of the content 21a.

The preprocessor 23a performs generation of these tables 22a to 22c in the preprocessing on the basis of information set to the CM 31 in advance by, for example, an administrator and information obtained by measurement processing and calculation processing below.

The measurement processing by the preprocessor 23a includes, for example, measurement of the write performance and read performance of each of the online storage resources 7 in the first storage tier 8a, and measurement of the activation time and the stop time of each of the intermediate and offline storage resources 7 in the second and third storage tiers 8.

The calculation processing by the preprocessor 23a includes, for example, calculation of the online data size and calculation of the access number determination value.

The calculation of the online data size calculates the following values on the basis of, for example, the read performance and write performance of the online storage resources 7 and the activation time and the stop time of the intermediate and offline storage resources 7, and selects a maximum value thereof as the online data size.

The size of data writable to a storage resource 7 in the first storage tier 8a during a first time period of the sum of the activation time and the stop time of a storage resource 7 in the second storage tier 8b The size of data readable from a storage resource 7 in the first storage tier 8a during the first time period The size of data writable to a storage resource 7 in the first storage tier 8a during a second time period of the sum of the activation time and the stop time of a storage resource 7 in the third storage tier 8c The size of data readable from a storage resource 7 in the first storage tier 8a during the second time period The online data size may be obtained by performing calculation of "(the activation time+the stop time)×(the write performance or the read performance)" for each combination of the storage resources 7, and selecting a maximum value of results of the calculation. Alternatively, a maximum value of (the activation time+the stop time) and a maximum value of the write performance and the read performance may be calculated in advance, and the online data size may be calculated as a product of these values.

The activation time is a time taken to activate a storage resource 7 in the stopped state. However, when an I/O access is made while the storage resource 7 is being stopped, a time (the stop time at maximum) taken to transition the storage resource 7 into the stopped state is to be added to the activation time. Thus, the stop time is taken into account as well as the activation time in the calculation of the online data size.

As described above, the online data size is a size of data that may be written to or read from the online storage resource 7 in a duration in which the intermediate or offline storage resource 7 transitions from a non-operating state to an operating state.

In the calculation of the access number determination value, for example, a value is calculated by dividing the unit time by the sum of the activation time and the stop time of a storage resource 7. This calculation result is a value indicating how many times a series of processing from a stop of the storage resource 7 to a reactivation thereof may be performed in the unit time. The activation time and the stop time of a storage resource 7 in the second storage tier 8b may be used in this calculation. When a plurality of storage resources 7 exist in the second storage tier 8b, an average value thereof may be used. Alternatively, the activation time and the stop time of a storage resource 7 in the third storage tier 8c may be used.

The write controller 23b is capable of performing processing to control writing of the content 21a stored in the cache memory 21 in response to reception of a write request from the server 6, for example, a request to write the content 61a.

This write control processing by the write controller 23b includes write processing and divided write processing of the content 21a.

In the write processing, the content capacity (the total data size, for example) of the content 21a to be written is compared with the online data size. If the total data size is smaller than the online data size, the entire data of the content 21a is stored in the first storage tier 8a.

The divided write processing is performed when the total data size of the content 21a is equal to or larger than the online data size. An example of divided write processing will be described below with reference to FIG. 7.

Figure 7:
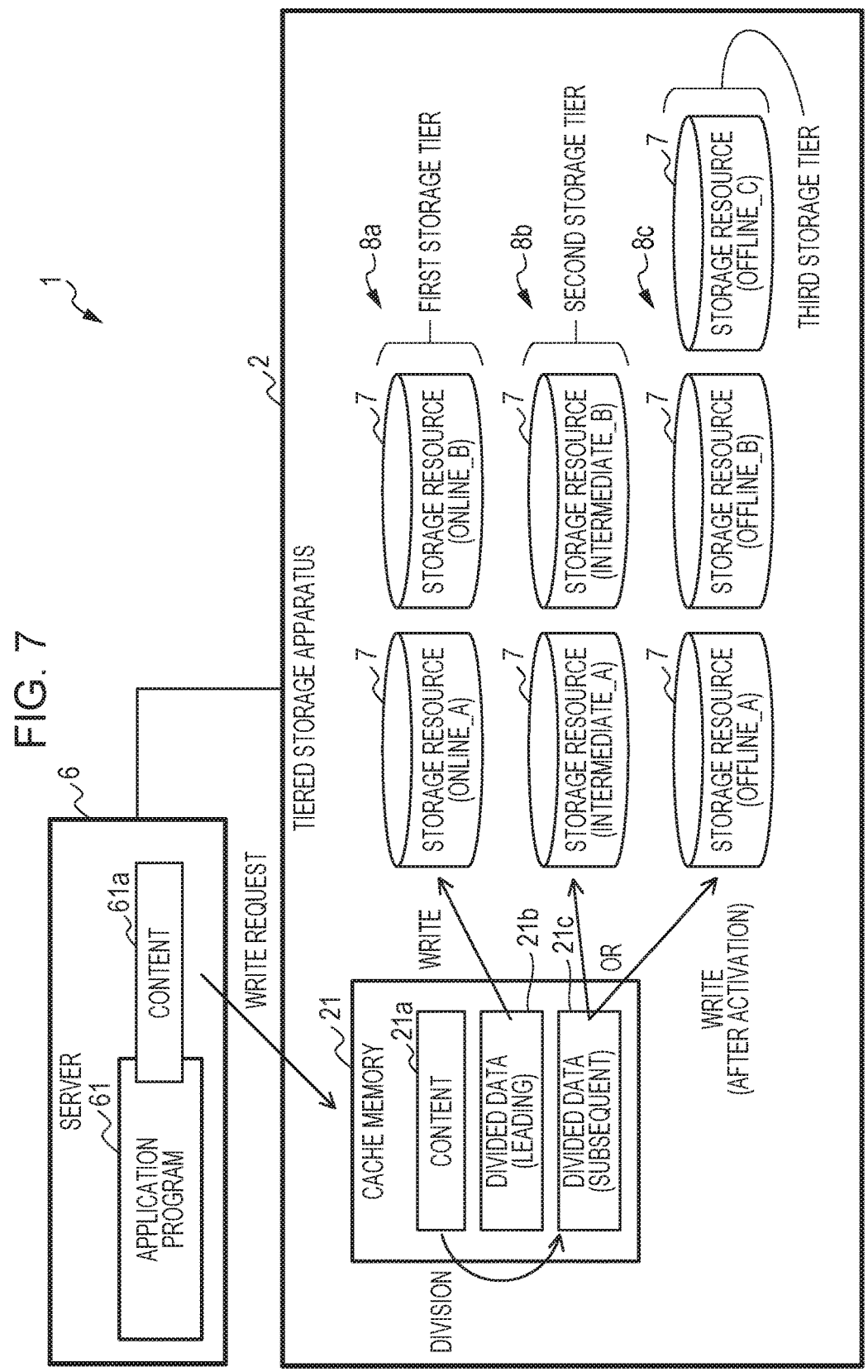
FIG. 7 is a diagram illustrating exemplary divided write processing.

As illustrated in FIG. 7, in the divided write processing, the content 21a of a write request received from the server 6 is divided on the basis of the online data size, and the leading data 21b is stored in the first storage tier 8a and the subsequent data 21c is stored in the second or third storage tier 8. For example, when the content 61a of the write request is to be newly stored, the subsequent data 21c is stored in the second storage tier 8b. When the content 61a of the write request is already stored in the storage resource 7, the subsequent data 21c is stored (overwritten, for example) in the second or third storage tier 8 in which the current subsequent data 21c is stored.

The leading data 21b is data of the head of the content 21a, and has the same size as the online data size. The subsequent data 21c is subsequent data obtained by removing the leading data 21b from the head of the content 21a.

The storage resource 7 for storing the subsequent data 21c in the divided write processing is preferably associated with a time slot including the time at which the write request for the content 21a is issued. The storage resource 7 associated with the time slot including the time at which the write request is issued may be identified by referring to the resource management table 22a.

As described above, a storage resource 7 in the second or third storage tier 8 may be in the stopped state when an access is made thereto. The write controller 23b according to the embodiment is capable of performing the following control when a storage resource 7 in the second or third storage tier 8 as the storage location of the subsequent data 21c is in the stopped state. For example, before write processing of the subsequent data 21c, the write controller 23b may instruct activation of the storage resource 7 in the stopped state simultaneously with write processing of the leading data 21b, and execute the write processing of the subsequent data 21c when the storage resource 7 becomes the activated state.

When a storage resource 7 in the first storage tier 8a has a shortage of the free capacity, the entire content 21a to be stored in the write processing or the leading data 21b in the divided write processing may be provisionally stored in the second storage tier 8b. When a storage resource 7 in the second storage tier 8b has also a shortage of the free capacity, this entire content 21a or leading data 21b may be stored in a lower tier, for example, the third storage tier 8c. In this case, in the divided write processing, the entire content 21a may be stored in the second or third storage tier 8 without performing division into the leading data 21b and the subsequent data 21c.

The storage of the entire content 21a or the leading data 21b in the second or third storage tier 8 is managed by setting the capacity shortage flag of the content management table 22c to "ON" for the relevant data.

When the content 21a or the leading data 21b is stored in the second or third storage tier 8, the write controller 23b may control a storage resource 7 as the storage location of the relevant data to be activated on a steady basis during a storage duration of the relevant data. This control to perform the steady activation is achieved by setting the activation flag of the resource management table 22a to "ON" for the relevant storage resource 7. When the free capacity of a storage resource 7 in the first storage tier 8a has increased to a capacity to allow storage of the entire content 21a or the leading data 21b, the controller 23 preferably rearrange the relevant from its current storage location to the first storage tier 8a immediately. This rearrangement processing is performed by the rearrangement controller 23d to be described later.

As described above, the write controller 23b is an example of a divider configured to divide the content 21a into the leading data 21b (first data) and the subsequent data 21c (second data) in response to reception of a write request of the content 21a. The write controller 23b is an example of a writer configured to write the first data 21b to a first storage resource 7 in the first storage group having a higher operating rate and write the second data 21c to a second storage resource 7 in the second storage group having an operating rate lower than that of the first storage group. The write controller 23b is an example of a first activation controller configured to activate, before writing of the second data 21c, the second storage resource 7 simultaneously with writing of the first data 21b when the second storage resource 7 is stopped.

The read controller 23c is capable of performing processing to control reading of the content 21a or the divided data 21b and 21c stored in the storage resources 7 in response to reception of a read request from the server 6, for example, a request to read the content 21a.

This read control processing by the read controller 23c includes read processing and divided read processing of the content 21a.

In the read processing, it is determined whether the content 21a to be read is divided. When the content 21a is not divided, the content 21a is read from a storage resource 7 storing the content 21a (a storage resource 7 in the first storage tier 8a, for example) and the content 21a is responded to the server 6.

The divided read processing is performed when the content 21a is divided. An example of divided read processing will be described below with reference to FIG. 8.

Figure 8:
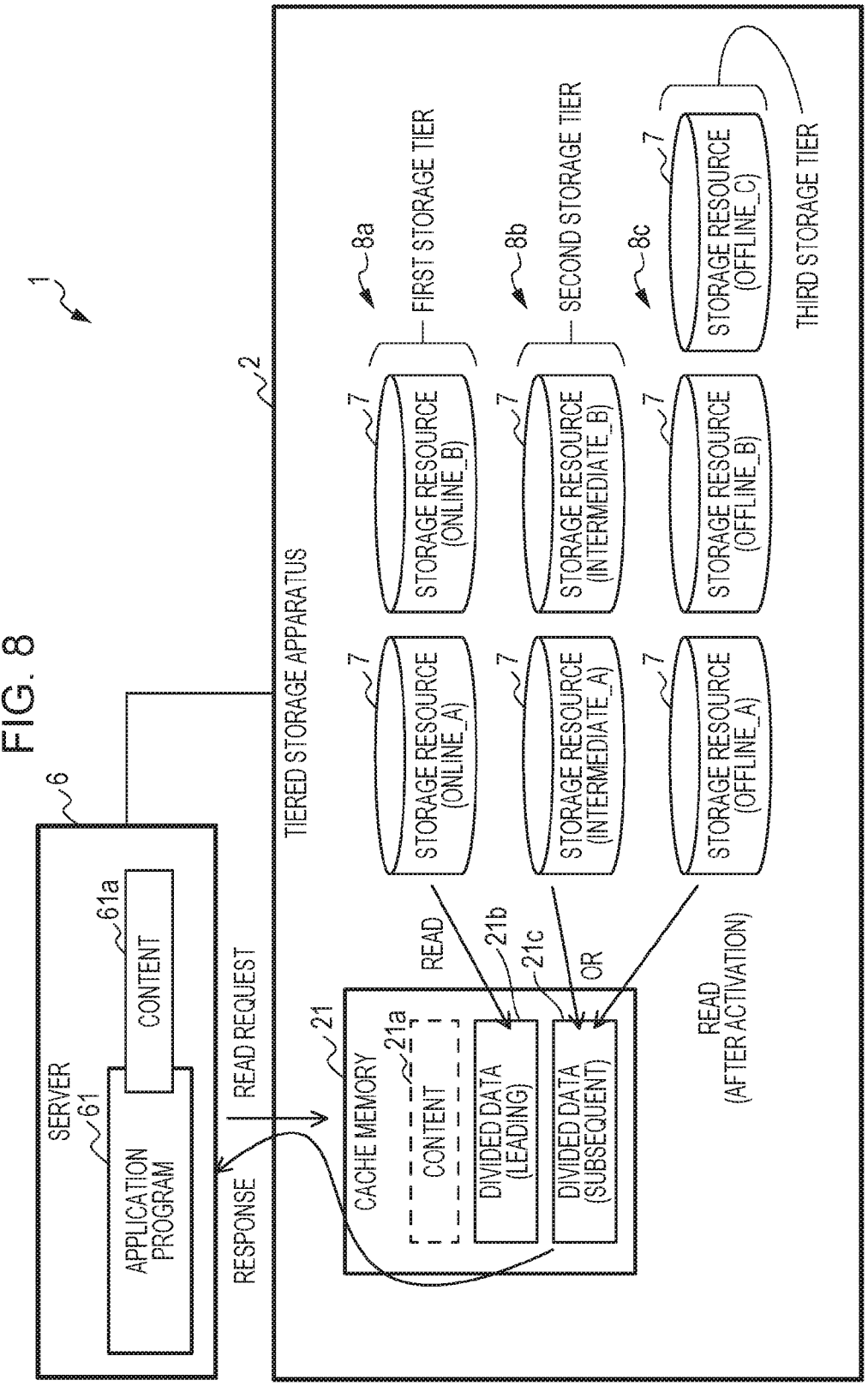
FIG. 8 is a diagram illustrating exemplary divided read processing.

As illustrated in FIG. 8, in the divided read processing, data which is the head of the content 21a of a read request received from the server 6 and has the same size as the online data size is read, as the leading data 21b, from the first storage tier 8a. The rest of the content 21a is read, as the subsequent data 21c, from the second or third storage tier 8 currently storing the subsequent data 21c. The leading data 21b and the subsequent data 21c thus read may be integrated as the content 21a on the cache memory 21 before being transmitted to the server 6, or may be transmitted to the server 6, for example, in an order of the leading data 21b and the subsequent data 21c at each completion of reading.

The read controller 23c according to the embodiment is capable of performing the following control if a storage resource 7 in the second or third storage tier 8 as the storage location of the subsequent data 21c is in the stopped state. For example, before read processing of the subsequent data 21c, the read controller 23c may instruct activation of the storage resource 7 in the stopped state simultaneously with read processing of the leading data 21b, and execute read processing of the subsequent data 21c when the storage resource 7 is activated.

When the leading data 21b is stored together with the subsequent data 21c in the second or third storage tier 8 because of the capacity shortage flag being set to "ON", the read controller 23c is capable of performing read processing of the leading data 21b and the subsequent data 21c (or entire content 21a).

As described above, the read controller 23c is an example of a reader configured to read the first data 21b from the first storage resource 7 in the first storage group and the second data 21c from the second storage resource 7 in the second storage group in response to reception of a read request of the content 21a on the basis of the content management table 22c stored in the memory unit 22. The read controller 23c is an example of a second activation controller configured to activate, before reading of the second data 21c, the second storage resource 7 simultaneously with reading of the second data 21c when the second storage resource 7 is stopped.

The rearrangement controller 23d is capable of performing rearrangement processing of the content 21a or the divided data 21b and 21c between storage tiers. The rearrangement processing is performed, for example, when the write control processing or the read control processing is performed, when a delete request for the content 21a is received from the server 6, or each time a predetermined time period has passed.

The rearrangement processing by the rearrangement controller 23d includes online rearrangement processing and intermediate/offline rearrangement processing.

In the online rearrangement processing, the leading data 21b of the content 21a of which the capacity shortage flag is "ON" is rearranged from the second or third storage tier 8 to the first storage tier 8a when the free capacity of an online storage resource 7 has increased.

The data transfer between tiers in the online rearrangement processing is performed, for example, when the free capacity of an online storage resource 7 is detected to be larger than the online data size because of a delete request for the content 21a stored in the online storage resource 7.

In the intermediate/offline rearrangement processing, rearrangement of data between the second and third storage tiers 8 is performed depending on the number of accesses in the latest unit time to the subsequent data 21c or the entire content 21a stored in the second or third storage tier 8. The entire content 21a stored in the second or third storage tier 8 is the content 21a of which the capacity shortage flag is "ON".

For example, in the intermediate/offline rearrangement processing, the rearrangement controller 23d counts, as the number of accesses, the number of time stamps in the unit time of each subsequent data 21c or entire content 21a stored in the second or third storage tier 8. On the basis of the number of accesses and the access number determination value, the rearrangement controller 23d sets the rearrangement flag of the relevant content 21a to "ON", and rearranges the content 21a of which the rearrangement flag is "ON" to another tier.

The rearrangement flag is set to "ON" under the following conditions:
With respect to the content 21a stored in a storage resource 7 in the second storage tier 8b
For number of accesses<determination value: ON
For number of accesses≥determination value: OFF
With respect to the content 21a stored in a storage resource 7 in the third storage tier 8c
For number of accesses<determination value: OFF
For number of accesses≥determination value: ON A rearrangement destination storage may be determined by counting the number of accesses to the content 21a to be rearranged for a time slot defined for each storage resource 7 included in the rearrangement destination tier, and selecting a storage resource 7 corresponding to a time slot having the largest number of accesses.

As described above, the rearrangement controller 23d is an example of a transfer unit configured to transfer the second data 21c stored in the second storage resource 7 in the second storage group to a third storage resource 7 in the third storage group having an operating rate different from that of the second storage group, depending on the number of accesses to the second data 21c in a predetermined duration. The rearrangement controller 23d as an example of a transfer unit counts the number of accesses to the second data 21c in each of a plurality of durations in the resource management table 22a, and transfers the second data 21c to a third storage resource 7 associated with a duration in which the counted number of accesses is largest.

An exemplary operation of the tiered storage system 1 configured as described above will be described with reference to FIGS. 9 to 20.

An exemplary operation of the entire processing in the tiered storage apparatus 2 of the tiered storage system 1 will be described first with reference to FIG. 9.

Figure 9:
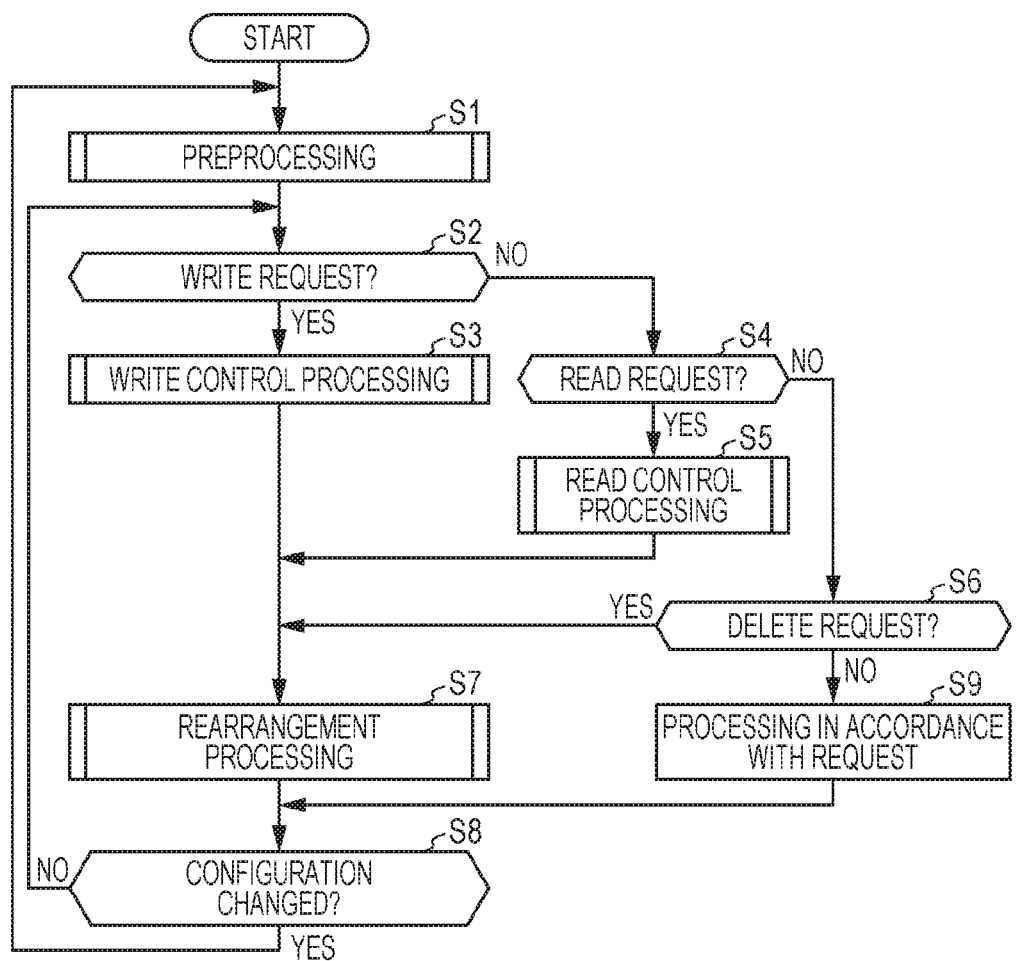
FIG. 9 is a flowchart of an exemplary operation of entire processing of the storage apparatus.

As illustrated in FIG. 9, when the tiered storage apparatus 2 is initially activated, the controller 23 performs the preprocessing through the preprocessor 23a (S1) and waits a request from the server 6. Having received a request from the server 6, the controller 23 determines the type of the relevant request (S2, S4, and S6) and performs processing depending on the type.

For example, if the received request is a write request for the content 61a (Yes at S2), the controller 23 performs the write control processing through the write controller 23b (S3), and the processing proceeds to S7.

At S7, the controller 23 performs the rearrangement processing through the rearrangement controller 23d, and determines whether a device configuration of, for example, the storage resource group 24 has changed (S8). If the configuration has not changed (No at S8), the processing proceeds to S2, and the controller 23 waits a request from the server 6. If the configuration has changed (Yes at S8), the processing proceeds to S1 and the preprocessing is performed again.

If the received request is a read request for the content 21a (No at S2, and Yes at S4), the controller 23 performs the read control processing through the read controller 23c (S5), and the processing proceeds to S7.

If the received request is a delete request for the content 21a (No at S4, and Yes at S6), the processing proceeds to S7. If the received request is not a delete request for the content 21a (No at S6), the controller 23 performs processing in accordance with the relevant request (S9), and the processing proceeds to S8.

Figure 10:
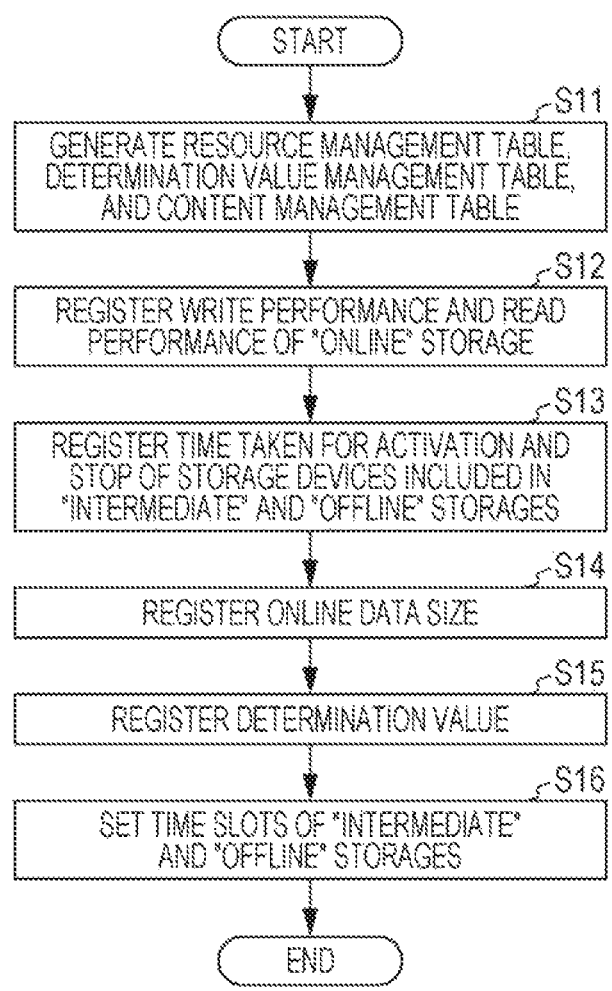
FIG. 10 is a flowchart of an exemplary operation of preprocessing.

An exemplary operation of the preprocessing performed by the preprocessor 23a will be described with reference to FIG. 10. As illustrated in FIG. 10, the preprocessor 23a generates the resource management table 22a, the determination value management table 22b, and the content management table 22c on the basis of information set in advance and information collected from the tiered storage apparatus 2 (S11).

Then, the preprocessor 23a measures the write performance and the read performance of each online storage resource 7 and registers a result of the measurement to the resource management table 22a (S12). The measurement of the write performance and the read performance may be performed by performing writing and reading of an arbitrary data size on the online storage resource 7 and measuring a time taken for the relevant processing to obtain a result of division of the data size by the time.

The preprocessor 23a measures times taken for activation and stop of a storage device 5 included in each of the intermediate and offline storage resources 7, and registers a result of the measurement to the resource management table 22a (S13). The measurement of the times taken for the activation and stop may be performed by measuring a time (the activation time) from an instruction to activate each storage device 5 until completion of the activation, and measuring a time (the stop time) from an instruction to stop the storage device 5 until completion of the stop. When the storage resource 7 includes a plurality of storage devices 5, a maximum value of the activation times of the storage devices 5 and a maximum value of the stop times thereof may be set as the activation time and the stop time of the relevant storage resource 7, respectively.

Next, the preprocessor 23a calculates a sum of the activation time and the stop time of each storage resource 7 on the basis of the resource management table 22a so as to acquire a maximum value of the sum of the activation time and the stop time, calculates the online data size, and registers a result of the calculation to the determination value management table 22b (S14). The online data size may be calculated as, for example, a product of a maximum value of the write performance and the read performance of the online storage resource 7 and the maximum value of the sum of the activation time and the stop time. Alternatively, the online data size may be calculated for each of writing and reading, and a larger one of results of the calculation may be set as the online data size.

The preprocessor 23a calculates a value by dividing the unit time by the maximum value of the sum of the activation time and the stop time, and registers a result of the calculation as a determination value to the determination value management table 22b (S15). This determination value is the number of repetitions of activation and stop executable in the unit time, and is used as a reference value for determining rearrangement of the subsequent data 21c.

Then, the preprocessor 23a sets a time slot of each of the intermediate and offline storage resources 7 to the resource management table 22a (S16), and the processing ends. The time slot is information that may be set to the tiered storage apparatus 2 in advance, and thus may be set to the resource management table 22a, for example, at S11.

An exemplary operation of the write control processing performed by the write controller 23b will be described with reference to FIGS. 11 to 15.

Figure 11:
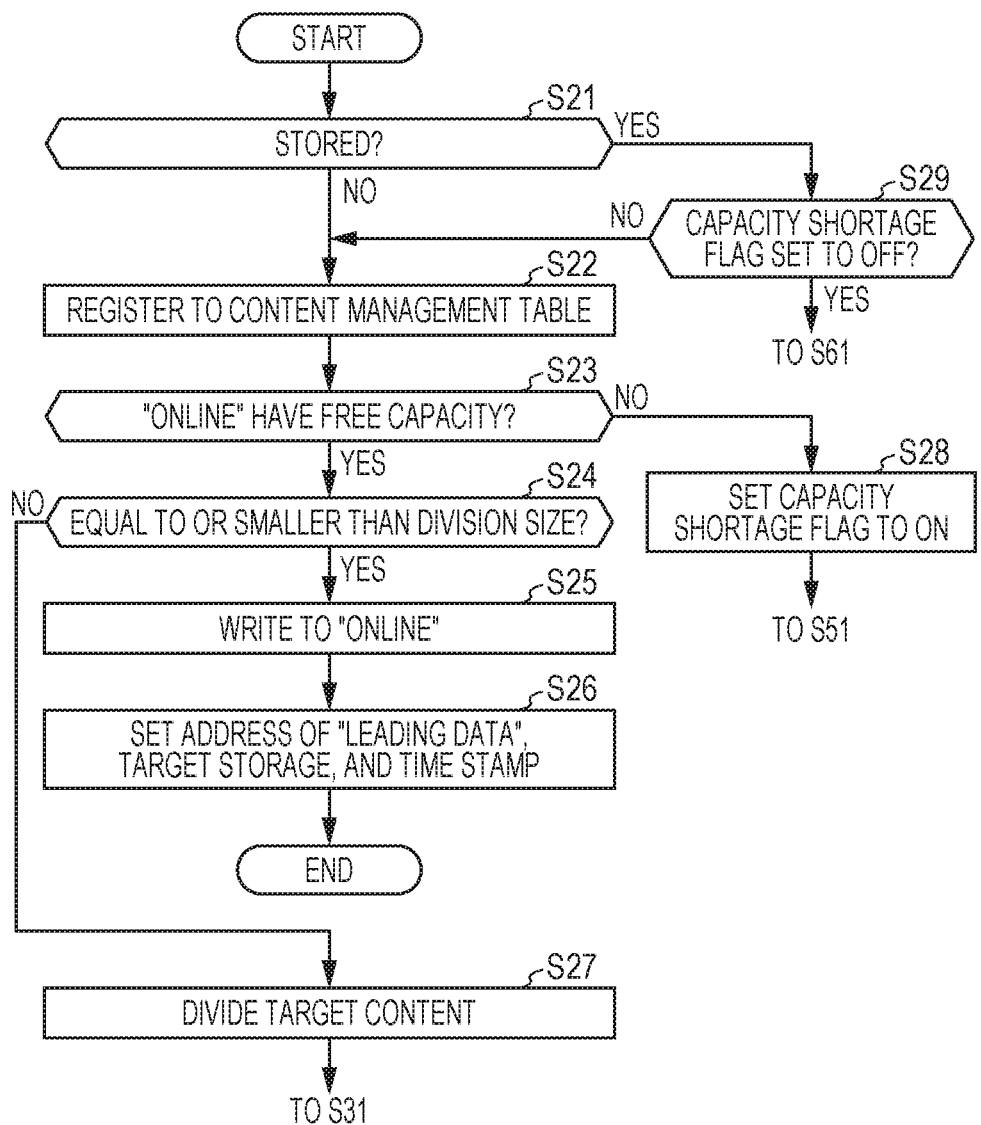
FIG. 11 is a flowchart of an exemplary operation of write control processing.

First, as illustrated in FIG. 11, the write controller 23b determines whether the content 21a as a target of a write request stored in the cache memory 21 is already stored in the storage resource group 24 by referring to the content management table 22c (S21). This determination may be achieved by determining the presence of an entry matching the data name of the content 21a in the content management table 22c.

If the target content 21a is not yet stored in the storage resource group 24 (No at S21), the write controller 23b registers a data name such as a file name or an object name of the target content 21a and a data size thereof to the content management table 22c (S22). The write controller 23b determines whether the online storage resources 7 have a free capacity available for storing the target content 21a by referring to the resource management table 22a (S23).

If the online storage resources 7 have a free capacity available (Yes at S23), the write controller 23b determines whether the data size of the target content 21a is equal to or smaller than a division size, in other words, the online data size by referring to the determination value management table 22b (S24).

If the data size is equal to or smaller than the division size (Yes at S24), the write controller 23b writes the target content 21a to the online storage resource 7 (S25), and the processing proceeds to S26. At S26, the write controller 23b sets in the content management table 22c, the storage resource 7 as the storage location of the target content 21a and the address in the storage resource 7 to the leading data resource and the leading data address, respectively, and the current time to the time stamp, and then the processing ends.

If the data size of the target content 21a is larger than the division size (No at S24), the processing proceeds to the divided write processing. For example, the write controller 23b divides the target content 21a on the basis of the division size (S27), and the processing proceeds to S31 in FIG. 12. The write controller 23b registers, to the content management table 22c, the data size (the data size of the content 21a–the data size of the leading data 21b (the online data size)) of the subsequent data 21c obtained through the division of the target content 21a.

Figure 12:
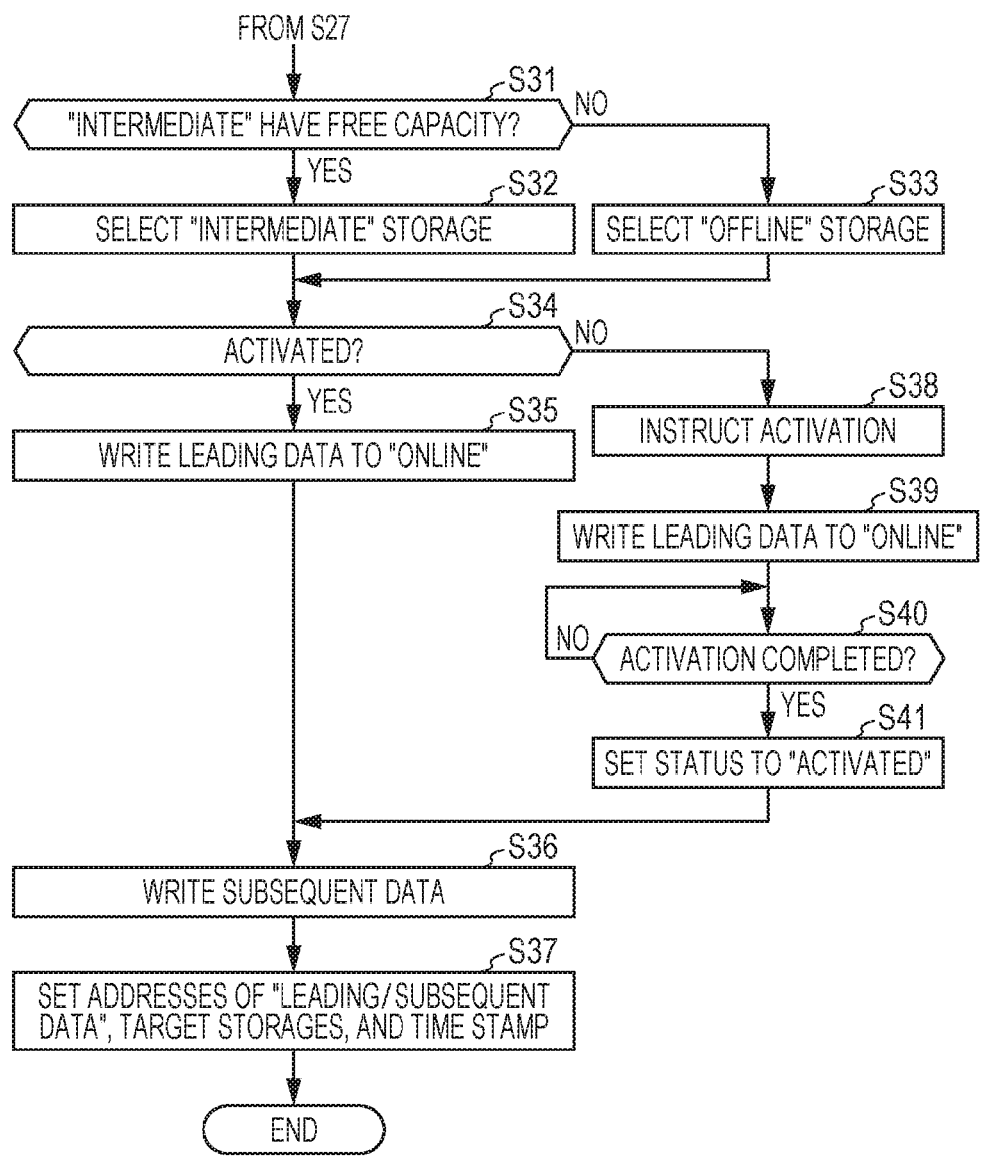
FIG. 12 is a flowchart of an exemplary operation of write control processing.

At S31 in FIG. 12, the write controller 23b determines whether the intermediate storage resources 7 have a free capacity available for storing the subsequent data 21c of the target content 21a by referring to the resource management table 22a and the content management table 22c. If the intermediate storage resources 7 have a free capacity available (Yes at S31), the write controller 23b selects an intermediate storage resource 7 corresponding to a time slot in which the write request is received by referring to the resource management table 22a (S32), and the processing proceeds to S34. If the intermediate storage resources 7 have no free capacity available (No at S31), the write controller 23b selects an offline storage resource 7 corresponding to a time slot in which the write request is received by referring to the resource management table 22a (S33), and the processing proceeds to S34.

At S34, the write controller 23b determines whether the storage resource 7 selected at S32 or S33 is activated by referring to the resource management table 22a. If the storage resource 7 is activated, for example, the status in the resource management table 22a is "activated" (Yes at S34), the write controller 23b writes the leading data 21b to the online storage resource 7 (S35), and the processing proceeds to S36.

At S36, the write controller 23b writes the subsequent data 21c to the selected storage resource 7. Then, the write controller 23b sets, in the content management table 22c, storage resources 7 as the storage locations of the divided data 21b and 21c to the leading and subsequent data resources, respectively, the addresses in the storage resources 7 to the leading and subsequent data addresses, respectively, and the current time to the time stamp (S37), and then the processing ends.

As described above, at S36, the subsequent data 21c is written to the storage resource 7 selected at S32 or S33. Thus, the subsequent data 21c is capable of being stored intensively in a storage resource 7 that receives a large number of accesses in a particular time slot in which an access to the content 21a may be made. Accordingly, in the intermediate or offline storage resource 7, a limited number of time slots receive intensive accesses, and thus a longer duration of the stopped state may be obtained in other time slots, which leads to a higher power saving efficiency.

At S34, if the selected storage resource 7 is not activated, for example, the status is "stopped" (No at S34), the write controller 23b instructs the DE 4 to activate the selected storage (S38). Then, the write controller 23b writes the leading data 21b to the online storage resource 7 (S39), and waits completion of the activation of the selected storage resource 7 (S40). If the activation is completed (Yes at S40), the write controller 23b sets "activated" as the status of the selected storage resource 7 in the resource management table 22a (S41), and the processing proceeds to S36.

In FIG. 11, at S23, if the online storage resources 7 have no free capacity available for storing the target content 21a (No at S23), the processing proceeds to S28. At S28, the write controller 23b sets "ON" as the capacity shortage flag of the target content 21a in the content management table 22c, and the processing proceeds to S51 in FIG. 13.

Figure 13:
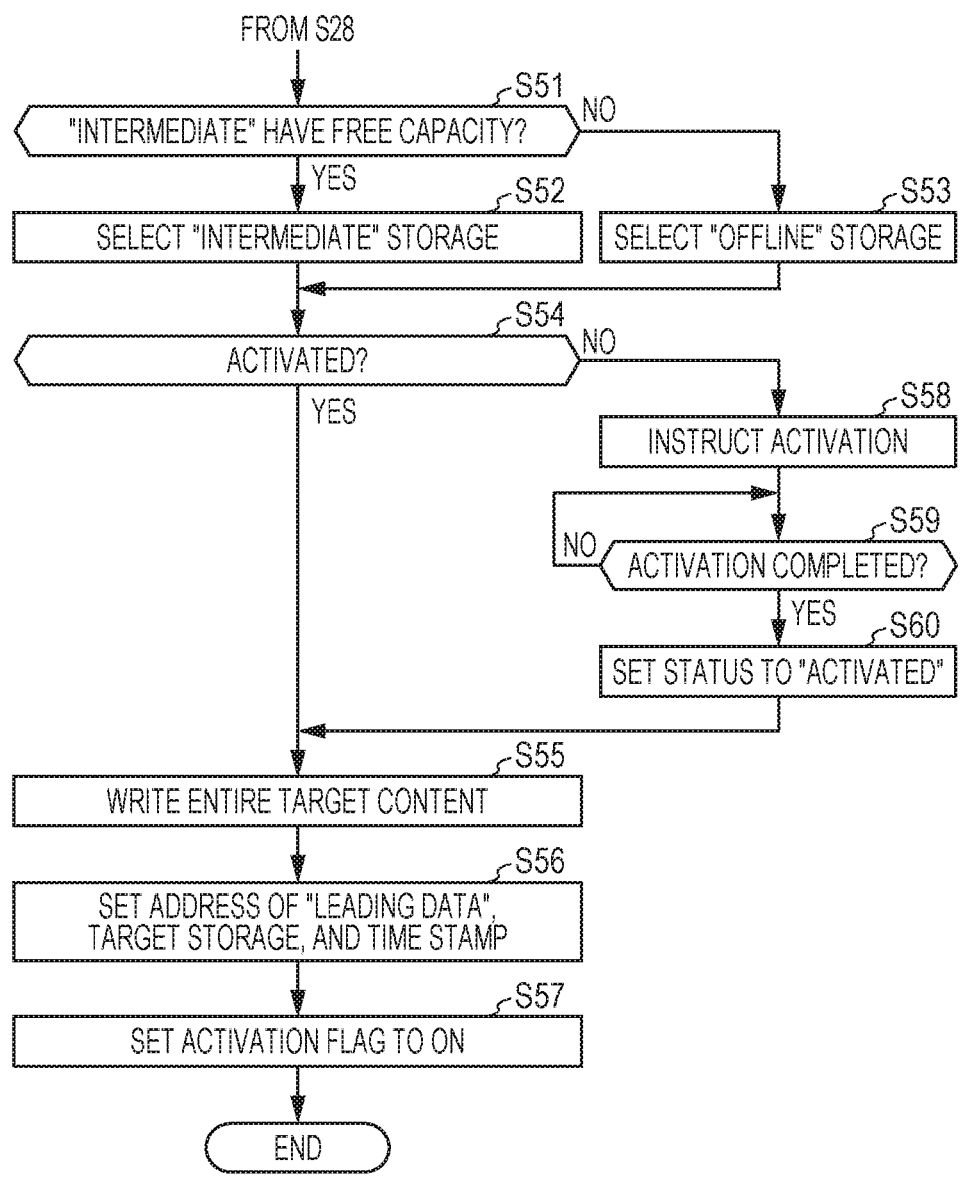
FIG. 13 is a flowchart of an exemplary operation of write control processing.

At S51 in FIG. 13, the write controller 23b determines whether the intermediate storage resources 7 have a free capacity available for storing the target content 21a by referring to the resource management table 22a and the content management table 22c. If the intermediate storage resources 7 have a free capacity available (Yes at S51), the write controller 23b selects an intermediate storage resource 7 corresponding to a time slot including a time of the write request, for example, a reception time by referring to the resource management table 22a (S52), and the processing proceeds to S54. If the intermediate storage resources 7 have no free capacity available (No at S51), the write controller 23b selects an offline storage resource 7 corresponding to a time slot including a reception time of the write request by referring to the resource management table 22a (S53), and the processing proceeds to S54.

At S54, the write controller 23b determines whether the storage resource 7 selected at S52 or S53 is activated by referring to the resource management table 22a, and the processing proceeds to S55 if the storage resource 7 is activated (Yes at S54).

At S55, the write controller 23b writes the entire target content 21a to the selected storage resource 7. Then, the write controller 23b sets, in the content management table 22c, the storage resource 7 as the storage location of the content 21a and the address in the storage resource 7 to the leading data resource and the leading data address, respectively, and the current time to the time stamp (S56). The write controller 23b also sets "ON" to the activation flag of the selected storage resource 7 in the resource management table 22a (S57), and the processing ends.

At S54, if the selected storage resource 7 is not activated (No at S54), the write controller 23b instructs the DE 4 to activate the selected storage resource 7 (S58), and waits completion of the activation of the selected storage resource 7 (S59). If the activation is completed (Yes at S59), the write controller 23b sets "activated" as the status of the selected storage resource 7 in the resource management table 22a (S60), and the processing proceeds to S55.

In FIG. 11, at S21, if the content 21a as the target of the write request is stored in the storage resource group 24 (Yes at S21), the processing proceeds to S29. This write request is a request to update the target content 21a.

At S29, the write controller 23b determines whether the capacity shortage flag of the target content 21a is "OFF" by referring to the content management table 22c. If the capacity shortage flag is not "OFF" (No at S29), the processing proceeds to S22. If the capacity shortage flag is "OFF" (Yes at S29), the processing proceeds to S61 in FIG. 14.

Figure 14:
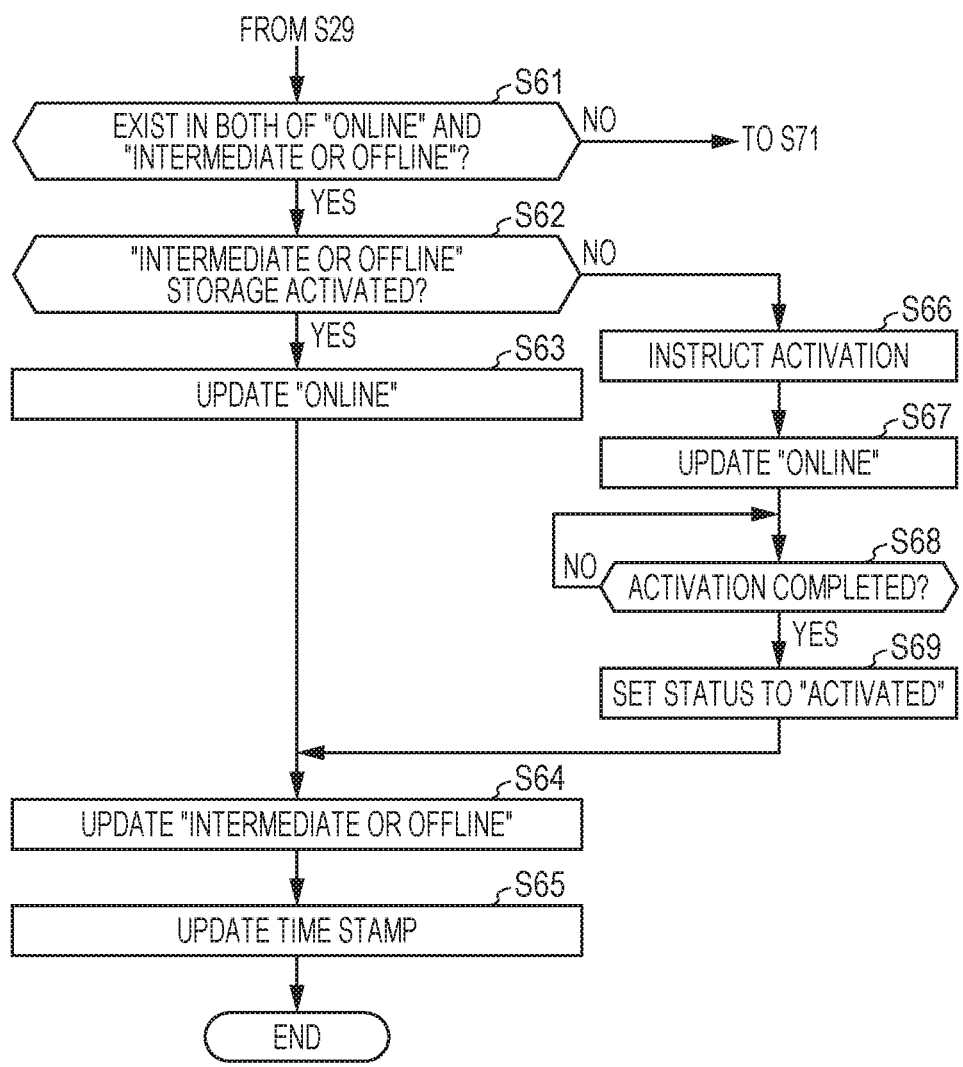
FIG. 14 is a flowchart of an exemplary operation of write control processing.

At S61 in FIG. 14, the write controller 23b determines whether a target part of the write request exists in both of the online storage resources 7 and the intermediate or offline storage resources 7 by referring to the content management table 22c.

The target part of the write request is write data received from the server 6 with the write request (update request). This write data is data of the entire content 21a if the update request is for update of the entire content 21a, or data of part to be updated if the update request is for update of part of the content 21a. The target part exists in both of the online storage resources 7 and the intermediate or offline storage resources 7, for example, when the target part is the entire content 21a or part thereof and the target part exists across a division boundary of the content 21a.

If the target part exists in both of the online storage resources 7 and the intermediate or offline storage resources 7 (Yes at S61), the write controller 23b determines whether the intermediate or offline storage resource 7 storing the target part is activated by referring to the resource management table 22a (S62). If the relevant storage resource 7 is activated (Yes at S62), the write controller 23b updates the target part stored in the online storage resource 7 (S63), and the processing proceeds to S64.

At S64, the write controller 23b updates the target part stored in the intermediate or offline storage resource 7. Then, the write controller 23b sets the current time to the time stamp in the content management table 22c (S65), and the processing ends.

At S62, if the intermediate or offline storage resource 7 storing the target part is not activated (No at S62), the write controller 23b instructs the DE 4 to activate the relevant storage resource 7 (S66). The write controller 23b also updates the target part stored in the online storage resource 7 (S67), and waits completion of the activation of the intermediate or offline storage resource 7 storing the target part (S68). If the activation is completed (Yes at S68), the write controller 23b sets "activated" to the status of the relevant storage resource 7 in the resource management table 22a (S69), and the processing proceeds to S64.

Figure 15:
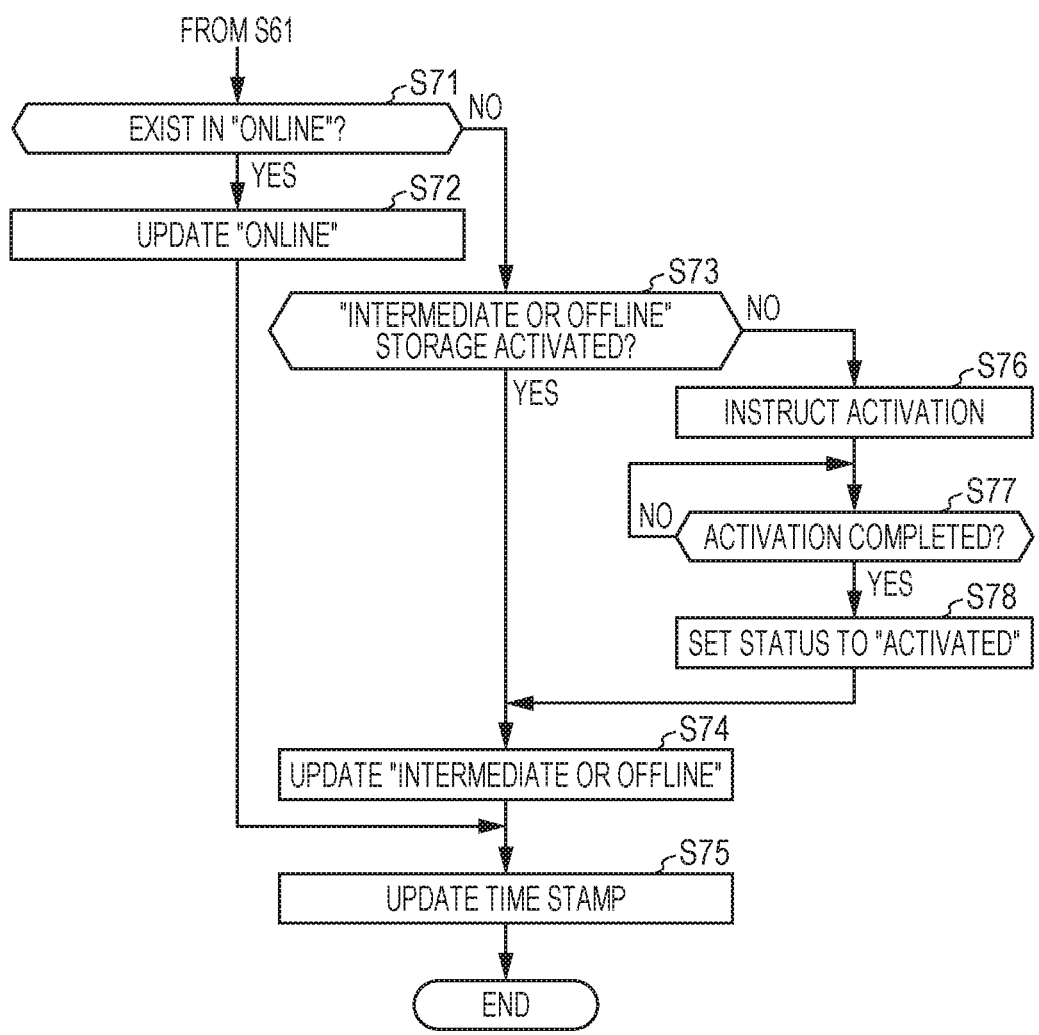
FIG. 15 is a flowchart of an exemplary operation of write control processing.

At S61, if the target part does not exist both of the online storage resources 7 and the intermediate or offline storage resources 7 (No at S61), the processing proceeds to S71 in FIG. 15.

At S71 in FIG. 15, the write controller 23b determines whether the target part of the write request exists in the online storage resources 7 by referring to the content management table 22c. The target part exists in the online storage resources 7, for example, when the target part is the entire content 21a and the division of the content 21a is not performed, or when the target part is part of the content 21a and the target part exists in the leading data 21b.

If the target part exists in the online storage resources 7 (Yes at S71), the write controller 23b updates the target part stored in the relevant online storage resource 7 (S72), and the processing proceeds to S75.

If the target part does not exist in the online storage resources 7, for example, the target part exists in the intermediate or offline storage resources 7 (No at S71), the processing proceeds to S73. The target part does not exist in the online storage resources 7, for example, when the target part is the entire content 21a and is stored in the second or third storage tier 8 due to a capacity shortage, or when the target part is part of the content 21a and exists in the subsequent data 21c.

At S73, the write controller 23b determines whether the intermediate or offline storage resource 7 storing the target part is activated by referring to the resource management table 22a. If the relevant storage resource 7 is activated (Yes at S73), the write controller 23b updates the target part stored in the relevant intermediate or offline storage resource 7 (S74), and the processing proceeds to S75.

At S75, the write controller 23b sets the current time to the time stamp in the content management table 22c, and the processing ends.

At S73, if the intermediate or offline storage resource 7 storing the target part is not activated (No at S73), the write controller 23b instructs the DE 4 to activate the relevant storage resource 7 (S76). The write controller 23b waits completion of the activation of the relevant storage resource 7 (S77). If the activation is completed (Yes at S77), the write controller 23b sets "activated" to the status of the relevant storage resource 7 in the resource management table 22a (S78), and the processing proceeds to S74.

Figure 16:
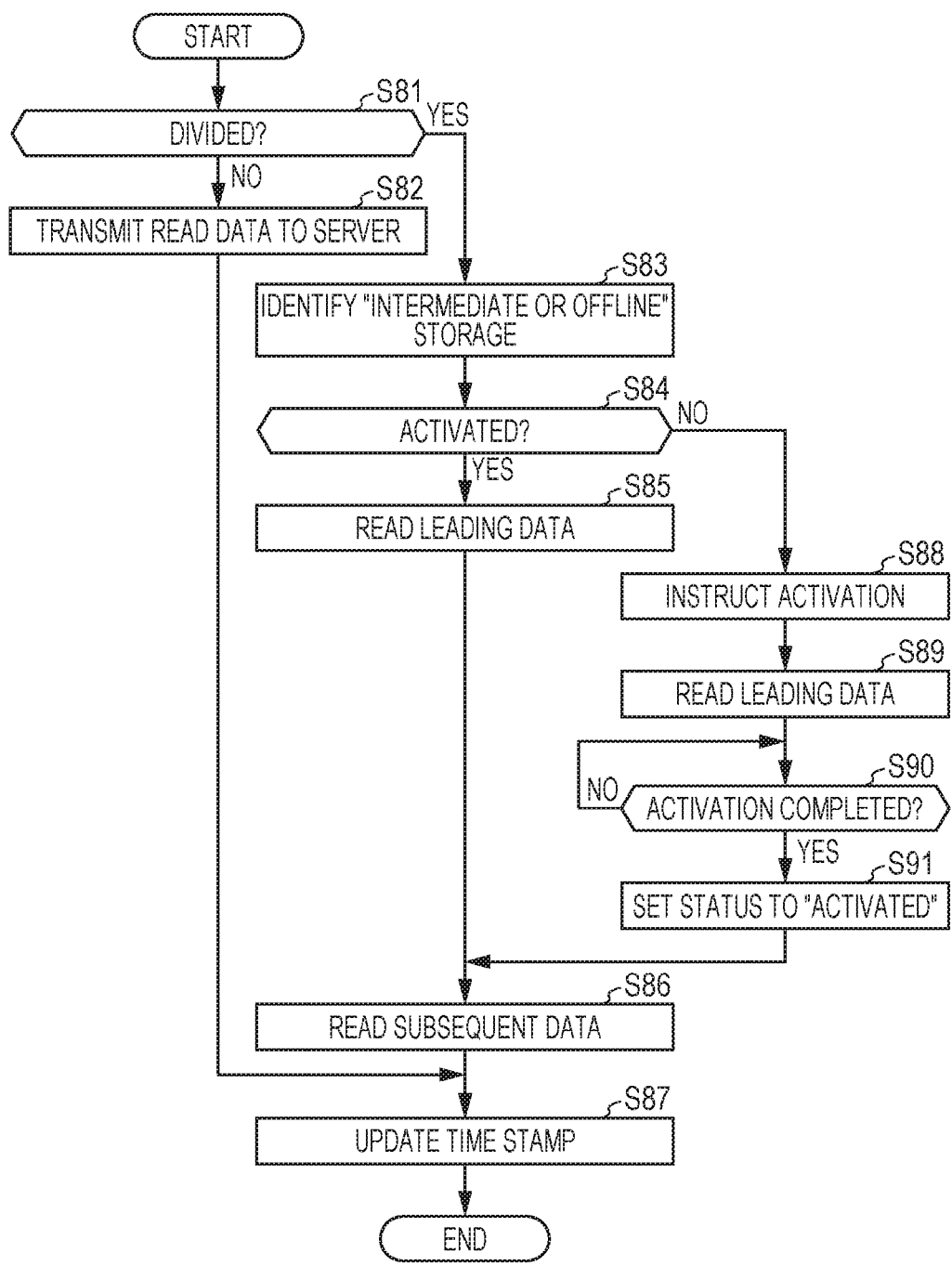
FIG. 16 is a flowchart of an exemplary operation of read control processing.

An exemplary operation of the read control processing performed by the read controller 23c will be described with reference to FIG. 16. First, as illustrated in FIG. 16, the read controller 23c determines whether the content 21a as a target of a read request is already divided by referring to the content management table 22c (S81). This determination may be achieved by determining whether at least one of the subsequent data size, the subsequent data resource, and the subsequent data address is set to an entry for the relevant content 21a in the content management table 22c.

If the target content 21a of the read request is not divided (No at S81), the read controller 23c reads the target content 21a from a target storage resource 7, for example, from an online storage resource 7 and transmits this read data to the server 6 (S82), and the processing proceeds to S87.

If the target content 21a of the read request is already divided (Yes at S81), the read controller 23c identifies an intermediate or offline storage resource 7 storing the subsequent data 21c by referring to the content management table 22c (S83). Then, the read controller 23c determines whether the identified storage resource 7 is activated by referring to the resource management table 22a (S84).

If the relevant storage resource 7 is activated (Yes at S84), the read controller 23c reads the leading data 21b stored in the online storage resource 7 and transmits the read data to the storage resource 7 (S85). Then, the read controller 23c reads the subsequent data 21c stored in the identified storage resource 7, transmits the read data to the server 6 (S86), and sets the current time to the time stamp in the content management table 22c (S87), and the processing ends.

At S84, if the identified intermediate or offline storage resource 7 is not activated (No at S84), the read controller 23c instructs the DE 4 to activate the relevant storage resource 7 (S88). The read controller 23c reads the leading data 21b stored in the online storage resource 7, transmits the read data to the server 6 (S89), and waits completion of activation of the identified storage resource 7 (S90). If the activation is completed (Yes at S90), the read controller 23c sets "activated" to the status of the relevant storage resource 7 in the resource management table 22a (S91), and the processing proceeds to S86.

The read controller 23c does not have to transmit the read leading data 21b to the server 6 at S85 or S89. In this case, the read controller 23c may merge the leading data 21b read at S85 or S89 and the subsequent data 21c read at S86 on the cache memory 21 so as to generate the content 21a, and may transmit the generated content 21a to the server 6.

As described above, the tiered storage apparatus 2 according to the embodiment stores the target content 21a of a write request in a divided manner in the first storage tier 8a that is accessible on a steady basis, and the second or third storage tier 8 that is mostly stopped for electric power saving but activated in response to an access request. The first storage tier 8a is capable of having sufficient response performance for the leading data, so that the read controller 23c may start reading immediately after having received a read request. The second or third storage tier 8, which may be stopped, is activated while the leading data 21b is being read, in response to an access request. Thus, the read controller 23c is capable of reading the subsequent data 21c from the second or third storage tier 8 immediately after completion of reading of the leading data 21b or during the reading.

This achieves an efficient reduction of electric power consumption of a plurality of the storage devices 5 included in the tiered storage apparatus 2 while maintaining a response delay of I/O processing at low level.

When the storage devices 5 having the same access performance are used at a plurality of tiers and the content 21a is divided and arranged at the tiers, such a configuration still achieves a response similar to that of a case of storing the content 21a in one storage resource 7 without dividing the content 21a. In particular, when the content 21a is large-capacity data of several GB or more, for example, reading of the data takes time enough to treat a time loss due to the divided read processing to be negligible, and thus an I/O response is maintained at a level similar to that of the case in which the content 21a is not divided.

In the preprocessing, a maximum value is calculated for a data size of the leading data 21b that is capable of being written to or read from the online storage resource 7 in a maximum time in which the intermediate or offline storage resource 7 storing the subsequent data 21c transitions to the activated state. Then, the division of the content 21a is performed on the basis of the maximum data size.

Thus, an appropriate size of the leading data 21b is determined such that the activation of the intermediate or offline storage resource 7 is completed until writing or reading of the leading data 21b to or from the online storage resource 7 is completed. This achieves a reduction in the response delay due to the division of the content 21a.

Figure 17:
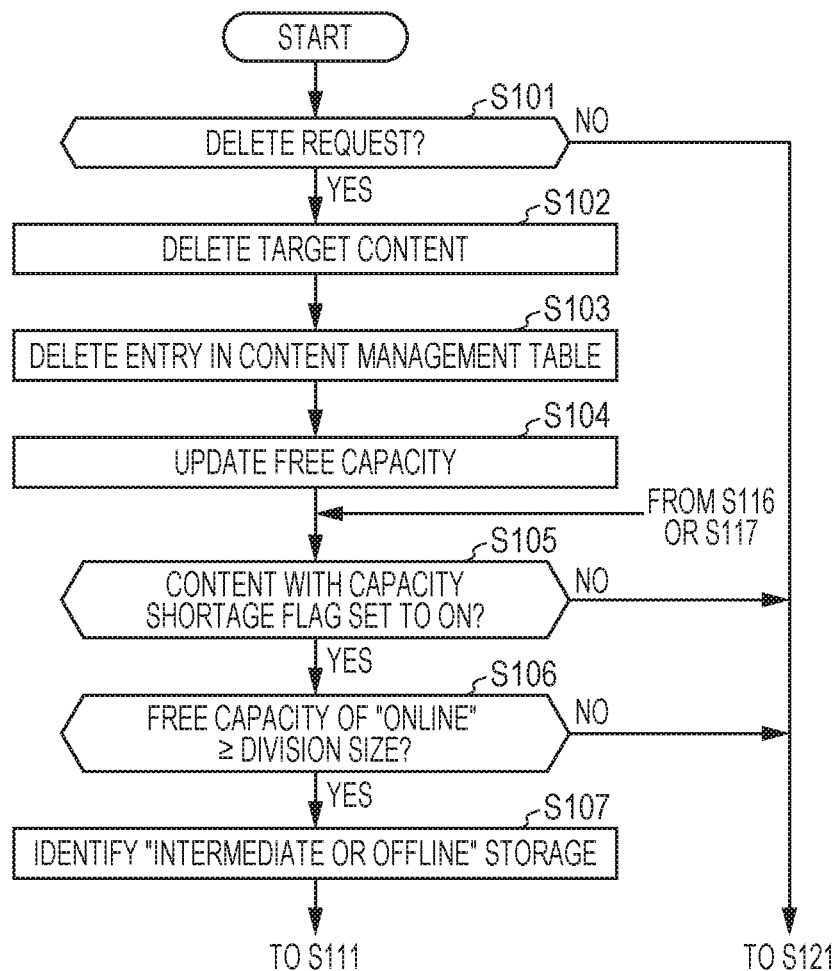
FIG. 17 is a flowchart of an exemplary operation of rearrangement processing.

An exemplary operation of the rearrangement processing performed by the rearrangement controller 23d will be described with reference to FIGS. 17 to 20. First, as illustrated in FIG. 17, the rearrangement controller 23d determines whether a delete request for the content 21a is received (S101). If a delete request is received (Yes at S101), the processing proceeds to the online rearrangement processing.

In the online rearrangement processing, the rearrangement controller 23d deletes the target content 21a from a target storage resource 7 storing the target content 21a (S102), and deletes an entry of the target content 21a in the content management table 22c (S103). The rearrangement controller 23d updates the free capacity of the relevant storage resource 7 in the resource management table 22a (S104).

Then, the rearrangement controller 23d determines whether contents 21a of which the capacity shortage flag is set to "ON" exist in the content management table 22c (S105). If contents 21a of which the capacity shortage flag is set to "ON" exist (Yes at S105), the rearrangement controller 23d select one of the relevant contents 21a and determines whether the free capacity of the online storage resources 7 is equal to or larger than the online data size, in other words, the data size of the leading data 21b (S106).

Figure 18:
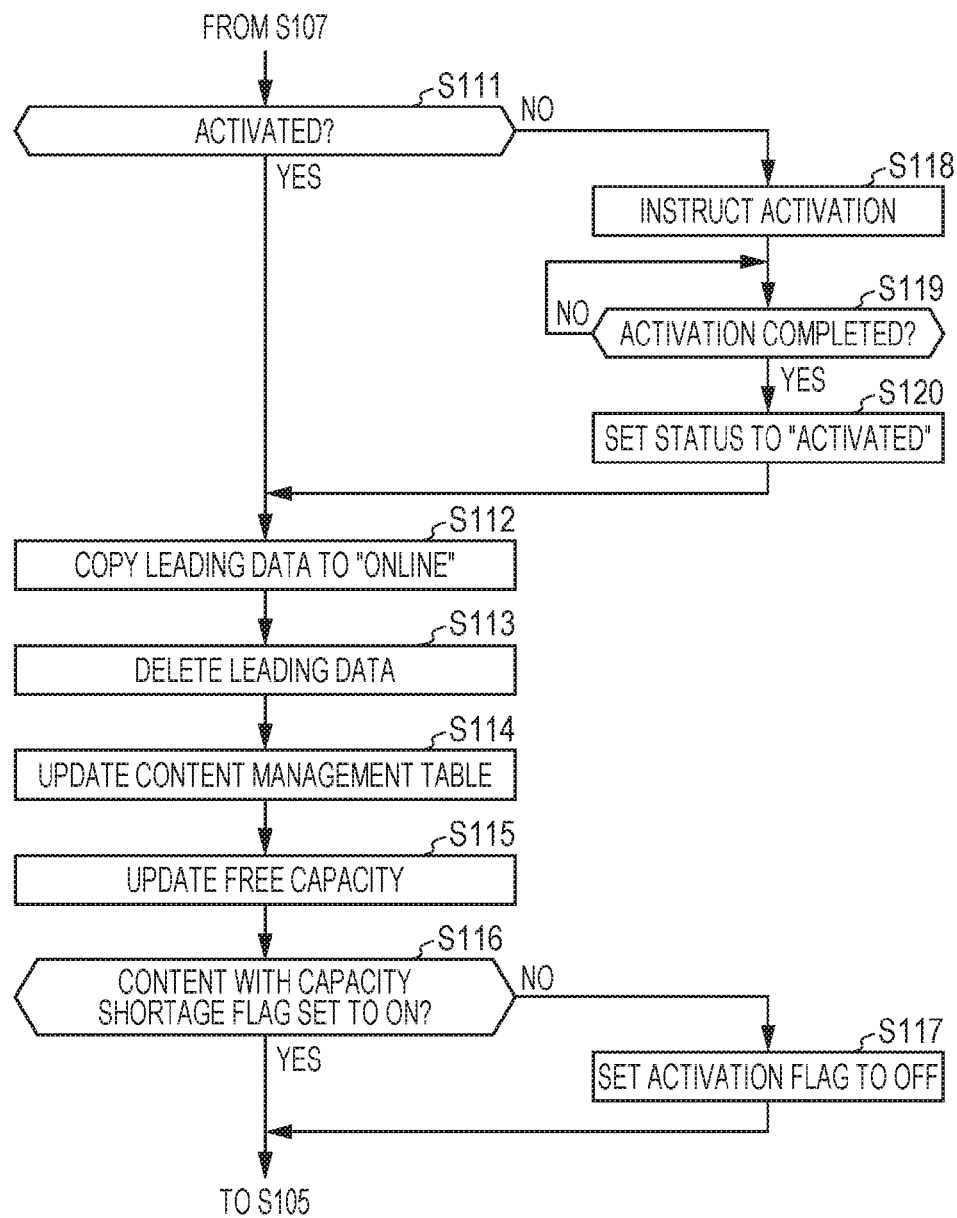
FIG. 18 is a flowchart of an exemplary operation of rearrangement processing.

If the free capacity of the online storage resources 7 is equal to or larger than the online data size (Yes at S106), the rearrangement controller 23d identifies an intermediate or offline storage resource 7 storing the selected content 21a (S107), and the processing proceeds to S111 in FIG. 18.

At S111 in FIG. 18, the rearrangement controller 23d determines whether the identified storage resource 7 is activated by referring to the resource management table 22a. If this storage resource 7 is activated (Yes at S111), the rearrangement controller 23d divides the relevant content 21a stored in the identified storage resource 7 on the basis of the online data size, and copies the leading data 21b to the online storage resource 7 (S112).

The rearrangement controller 23d deletes the leading data 21b in the identified storage resource 7 but not the subsequent data 21c (S113). Then, the rearrangement controller 23d sets (updates), in the content management table 22c, storage resources 7 as the storage locations of the divided data 21b and 21c to the leading and subsequent data resources, the addresses in the storage resources 7 to the leading and subsequent data addresses, and the current time to the time stamp. The rearrangement controller 23d sets "OFF" to the capacity shortage flag (S114), and updates the free capacity (the online storage resource 7 and the identified storage resource 7) of the resource management table 22a (S115).

The rearrangement controller 23d determines whether the contents 21a of which the capacity shortage flag is set to "ON" exist in the identified storage resource 7 by referring to the content management table 22c (S116). If contents 21a of which the capacity shortage flag is set to "ON" exist in the identified storage resource 7 (Yes at S116), the processing proceeds to S105 in FIG. 17. If no content 21a of which the capacity shortage flag is set to "ON" exists in the identified storage resource 7 (No at S116), the rearrangement controller 23d sets "OFF" to the activation flag of the identified storage resource 7 in the resource management table 22a, (S117), and the processing proceeds to S105 in FIG. 17.

At S111, if the identified storage resource 7 is not activated (No at S111), the rearrangement controller 23d instructs the DE 4 to activate the relevant storage resource 7 (S118). The rearrangement controller 23d waits completion of activation of the relevant storage resource 7 (S119). If the activation is completed (Yes at S119), the rearrangement controller 23d sets "activated" to the status of the relevant storage resource 7 in the resource management table 22a (S120), and the processing proceeds to S112.

As described above, by the online rearrangement processing, the leading data 21b or the entire content 21a is dynamically rearranged from the intermediate or offline storage resources 7 to the online storage resources 7 in response to resolution of a capacity shortage of the online storage resources 7. This achieves a reduction in a probability that the leading data 21b or the entire content 21a exists in an intermediate or offline storage resource 7 in the stopped state, thereby achieving reduced response delay.

In FIG. 17, at S106, if the free capacity of the online storage resources 7 is smaller than the online data size (No at S106), the processing proceeds to the intermediate/offline rearrangement processing. If no delete request for a content 21a is received at S101 (No at S101), or if no content 21a of which the capacity shortage flag is set to "ON" exists at S105 (No at S105), the processing proceeds to the intermediate/offline rearrangement processing.

Figure 19:
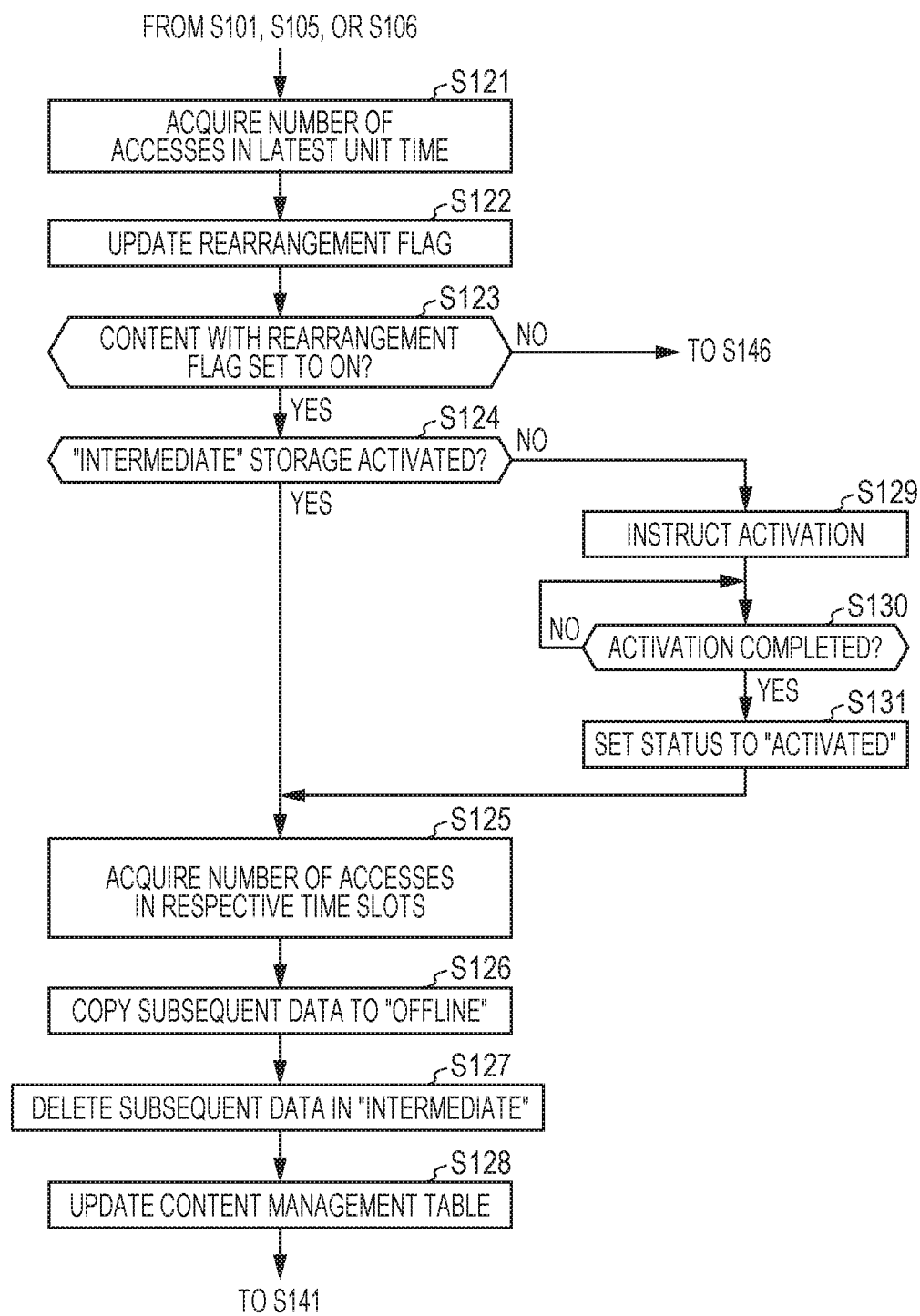
FIG. 19 is a flowchart of an exemplary operation of rearrangement processing.

As illustrated in FIG. 19, in the intermediate/offline rearrangement processing, the rearrangement controller 23d acquires the number of accesses in the latest unit time for each subsequent data 21c stored in the intermediate or offline storage resources 7, (S121). The acquisition of the number of accesses in the latest unit time may be achieved by, for example, counting the total number of time stamps included in the latest unit time.

The rearrangement controller 23d compares the determination value in the determination value management table 22b and the acquired number of accesses, and updates the rearrangement flag of each content 21a in the content management table 22c (S122). The rearrangement flag is changed to "ON" for the number of accesses being smaller than the determination value when the subsequent data 21c is stored in an intermediate storage resource 7, and is changed to "ON" for the number of accesses being equal to or larger than the determination value when the subsequent data 21c is stored in an offline storage resource 7.

Then, the rearrangement controller 23d determines whether contents 21a of which the rearrangement flag is set to "ON" exist (S123). If no content 21a of which the rearrangement flag is set to "ON" exists (No at S123), the processing proceeds to S146 in FIG. 20. If contents 21a of which the rearrangement flag is set to "ON" exist (Yes at S123), the rearrangement controller 23d determines whether an intermediate storage resource 7 storing the subsequent data 21c of which the rearrangement flag is "ON" is activated by referring to the resource management table 22a (S124).

If the intermediate storage resource 7 is activated (Yes at S124), the rearrangement controller 23d selects subsequent data 21c that is stored in the intermediate storage resource 7 and of which the rearrangement flag is "ON". Then, the rearrangement controller 23d acquires the number of accesses to the selected subsequent data 21c in respective time slots defined for offline storage resources 7 (S125). The acquisition of the number of accesses in the respective time slots may be achieved by, for example, counting the total number of time stamps included in the respective time slots.

Then, the rearrangement controller 23d copies the subsequent data 21c to an offline storage resource 7 corresponding to a time slot in which the number of accesses is largest (S126), and deletes the subsequent data 21c in the intermediate storage resource 7 (S127). Then, the rearrangement controller 23d sets (updates), in the content management table 22c, the storage resource 7 as the storage location of the subsequent data 21c to the subsequent data resource, the address in the storage resource 7 to the subsequent data address, and the current time to the time stamp. The rearrangement controller 23d sets "OFF" to the rearrangement flag (S128), and the processing proceeds to S141 in FIG. 20.

At S124, if the intermediate storage resource 7 storing the subsequent data 21c of which the rearrangement flag is "ON" is not activated (No at S124), the rearrangement controller 23d instructs the DE 4 to activate the relevant storage resource 7 (S129). The rearrangement controller 23d waits completion of activation of the intermediate storage resource 7 (S130). If the activation is completed (Yes at S130), the rearrangement controller 23d sets "activated" to the status of the relevant storage resource 7 in the resource management table 22a (S131), and the processing proceeds to S125.

Figure 20:
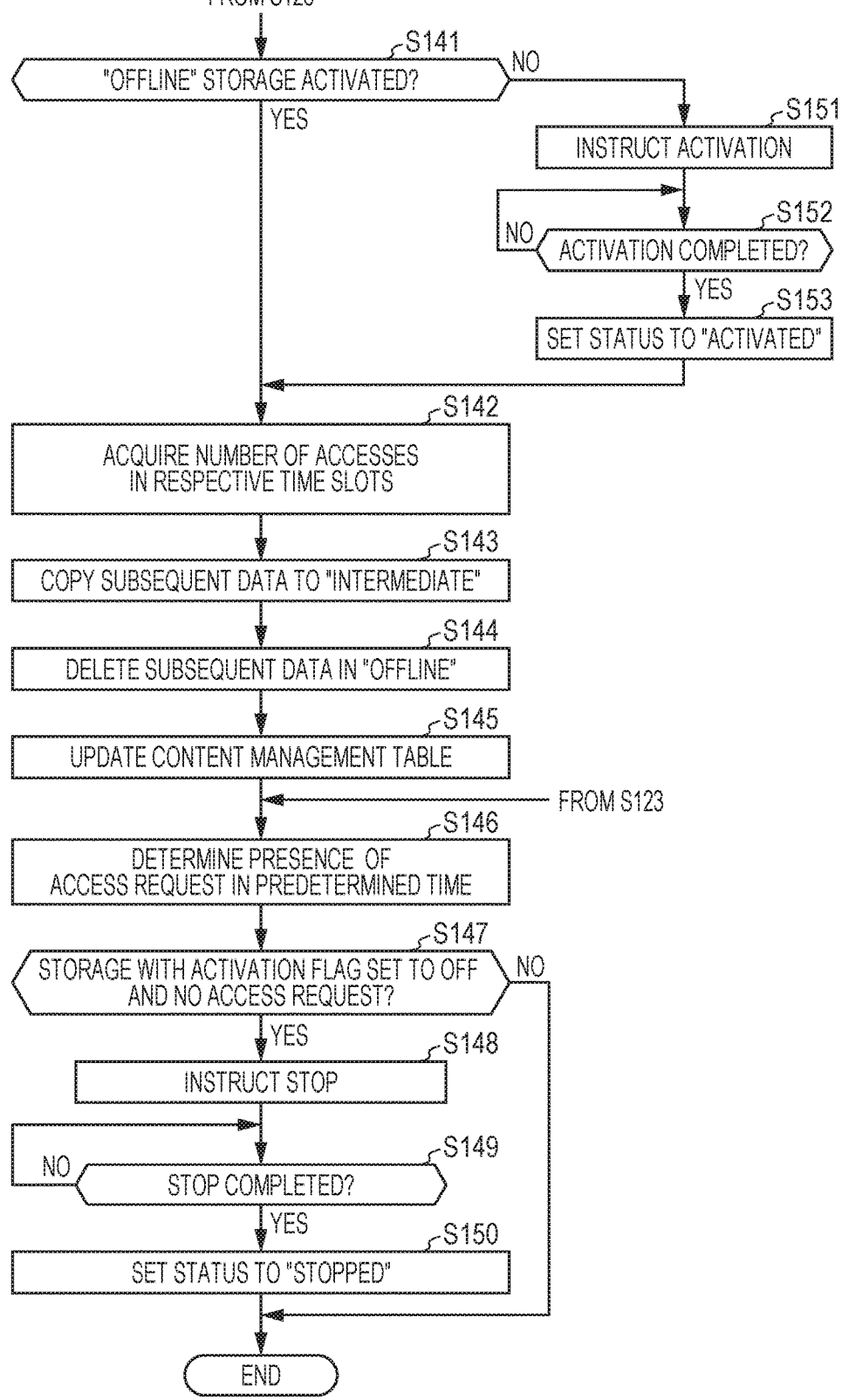
FIG. 20 is a flowchart of an exemplary operation of rearrangement processing.

At S141 in FIG. 20, the rearrangement controller 23d determines whether an offline storage resource 7 storing the subsequent data 21c of which the rearrangement flag is "ON" is activated by referring to the resource management table 22a.

If the offline storage resource 7 is activated (Yes at S141), the rearrangement controller 23d selects the subsequent data 21c that is stored in the offline storage resource 7 and of which the rearrangement flag is "ON". Then, the rearrangement controller 23d acquires the number of accesses to the selected subsequent data 21c in respective time slots defined for the intermediate storage resources 7 (S142).

Then, the rearrangement controller 23d copies the subsequent data 21c to an intermediate storage resource 7 corresponding to a time slot in which the number of accesses is largest (S143), and deletes the subsequent data 21c in the offline storage resource 7 (S144). Then, the rearrangement controller 23d sets (updates), in the content management table 22c, the storage resource 7 as the storage location of the subsequent data 21c to the subsequent data resource, the address in the storage resource 7 to the subsequent data address, and the current time to the time stamp. The rearrangement controller 23d sets "OFF" to the rearrangement flag (S145), and the processing proceeds to S146.

At S146, the rearrangement controller 23d determines the presence of a request to access the content 21a stored in each of the intermediate and offline storage resources 7 in a predetermined time by referring to the resource management table 22a and the content management table 22c. The predetermined time may be several seconds to several minutes. Then, the rearrangement controller 23d determines whether there exist intermediate or offline storage resources 7 of which the activation flag is "OFF" and to which no access request is made in the predetermined time (S147).

If no intermediate or offline storage resource 7 satisfies this condition (No at S147), the processing ends. If intermediate or offline storage resources 7 satisfying the condition exist (Yes at S147), the rearrangement controller 23d instructs the DE 4 to stop the relevant intermediate or offline storage resources 7 (S148). The rearrangement controller 23d waits completion of stop of the relevant intermediate or offline storage resources 7 (S149). if the stop is completed (Yes at S149), the rearrangement controller 23*d* sets "stopped" to the status of the relevant storage resources 7 in the resource management table 22*a* (S150), and the processing ends.

At S141, if the offline storage resource 7 storing the subsequent data 21*c* of which the rearrangement flag is "ON" is not activated (No at S141), the rearrangement controller 23*d* instructs the DE 4 to activate the relevant storage resource 7 (S151). The rearrangement controller 23*d* waits completion of activation of the relevant offline storage resource 7 (S152). If the activation is completed (Yes at S152), the rearrangement controller 23*d* sets "activated" to the status of the relevant storage resource 7 in the resource management table 22*a* (S153), and the processing proceeds to S142.

Although the description of FIGS. 19 and 20 assumes that the intermediate/offline rearrangement processing is performed on a subsequent data 21*c*, the present embodiment is not limited thereto. The processing may be performed on the leading data 21*b* of which the capacity shortage flag is "ON" or the entire content 21*a*. In this case, the rearrangement controller 23*d* sets (updates), in the content management table 22*c*, the leading data resource, the leading data address, and the current time.

As described above, the tiered storage apparatus 2 according to the embodiment performs the inter-tier rearrangement of the divided content 21*a*, for example, a subsequent data 21*c* depending on the number of accesses thereto in the latest unit time. A storage resource 7 as a rearrangement destination of the subsequent data 21*c* is determined depending on the number of accesses in each time slot defined for each storage resource 7 at a tier as a rearrangement destination. This allows the tiered storage apparatus 2 to optimize the frequency and the time slot of accesses of the respective intermediate/offline storage resources 7, thereby efficiently achieving reduced electric power consumption.

The technology according to the embodiment described above allows the following modifications and changes.

For example, functional blocks of the tiered storage apparatus 2 (CM 31) illustrated in FIG. 3 may be integrated in an arbitrary combination, or separated.

Although the storage resource group 24 illustrated in FIG. 3 includes two online storage resources 7, two intermediate storage resources 7, and three offline storage resources 7, the present embodiment is not limited thereto, and arbitrary numbers of storage resources 7 may be provided.

Although the storage resource group 24 has three (online, intermediate, and offline) storage tiers, the present embodiment is not limited thereto, and the storage resource group 24 may have two (online and offline) storage tiers, or have four tiers or more.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control device, comprising:
a memory; and
a processor coupled to the memory, the processor configured to:
receive a write request to write content data,
divide the content data into leading first data and subsequent second data,
write the first data to a first storage resource in a first storage group among a plurality of storage groups having operating rates different from each other, the first storage group having a first operating rate higher than operating rates of any other storage groups among the plurality of storage groups,
write the second data to a second storage resource in a second storage group among the plurality of storage groups, the second storage group having a second operating rate lower than the first operating rate, and
activate, in parallel with writing of the first data, the second storage resource when the second storage resource is in a non-operating state, the first data having a predetermined size enabling the first data to be written to or read from the first storage resource in a time duration in which the second storage resource transitions from the non-operating state to an operating state.

2. The control device according to claim 1, wherein the processor is configured to select, as the second storage resource, a storage resource associated with a first time slot in storage information, the first time slot including a time at which the write request is received, the storage information associating a plurality of storage resources in the second storage group with respective time slots different from each other.

3. The control device according to claim 1, wherein the processor is configured to
receive a read request to read the content data,
read the first data from the first storage resource on basis of content information indicating respective storage locations of the first data and the second data,
read the second data from the second storage resource on basis of the content information, and
activate, in parallel with the reading of the first data, the second storage resource when the second storage resource is in the non-operating state.

4. The control device according to claim 1, wherein the processor is configured to transfer, depending on a number of accesses to the second data in a predetermined time duration, the second data stored in the second storage resource to a third storage resource in a third storage group among the plurality of storage groups, the third storage group having a third operating rate lower than the second operating rate.

5. The control device according to claim 4, wherein the processor is configured to
count a number of accesses to the second data in respective time slots different from each other, the respective time slots being associated in storage information with a plurality of storage resources in the third storage group,
determine a first time slot in which a highest number of accesses to the second data is counted among the time slots, and
select, as the third storage resource, a storage resource associated with the first time slot on basis of the storage information.

6. The control device according to claim 1, wherein the plurality of storage groups respectively include one or more storage resources each having an access performance predetermined for the respective storage groups.

7. A storage system, comprising:
a plurality of storage groups having operating rates different from each other; and
a processor configured to
receive a write request to write content data,
divide the content data into leading first data and subsequent second data,
write the first data to a first storage resource in a first storage group among the plurality of storage groups, the first storage group having a first operating rate higher than operating rates of any other storage groups among the plurality of storage groups,
write the second data to a second storage resource in a second storage group among the plurality of storage groups, the second storage group having a second operating rate lower than the first operating rate, and
activate, in parallel with writing of the first data, the second storage resource when the second storage resource is in a non-operating state, the first data having a predetermined size enabling the first data to be written to or read from the first storage resource in a time duration in which the second storage resource transitions from the non-operating state to an operating state during the writing of the first data.

8. The storage system according to claim 7, wherein the processor is configured to select, as the second storage resource, a storage resource associated with a first time slot in storage information, the first time slot including a time at which the write request is received, the storage information associating a plurality of storage resources in the second storage group with respective time slots different from each other.

9. The storage system according to claim 7, wherein the processor is configured to
receive a read request to read the content data,
read the first data from the first storage resource on basis of content information indicating respective storage locations of the first data and the second data,
read the second data from the second storage resource on basis of the content information, and
activate, in parallel with the reading of the first data, the second storage resource when the second storage resource is in the non-operating state.

10. The storage system according to claim 7, wherein the processor is configured to transfer, depending on a number of accesses to the second data in a predetermined time duration, the second data stored in the second storage resource to a third storage resource in a third storage group among the plurality of storage groups, the third storage group having a third operating rate lower than the second operating rate.

11. The storage system according to claim 10, wherein the processor is configured to
count a number of accesses to the second data in respective time slots different from each other, the respective time slots being associated in storage information with a plurality of storage resources in the third storage group,
determine a first time slot in which a highest number of accesses to the second data is counted among the time slots, and
select, as the third storage resource, a storage resource associated with the first time slot on basis of the storage information.

12. The storage system according to claim 7, wherein the plurality of storage groups respectively include one or more storage resources each having an access performance predetermined for the respective storage groups.

13. A non-transitory computer-readable recording medium having stored therein a program that causes a computer to execute a process, the process comprising:
receiving a write request to write content data;
dividing the content data into leading first data and subsequent second data;
writing the first data to a first storage resource in a first storage group among a plurality of storage groups having operating rates different from each other, the first storage group having a first operating rate higher than operating rates of any other storage groups among the plurality of storage groups;
writing the second data to a second storage resource in a second storage group among the plurality of storage groups, the second storage group having a second operating rate lower than the first operating rate; and
activating, in parallel with the writing of the first data, the second storage resource when the second storage resource is in a non-operating state, the first data having a predetermined size enabling the first data to be written to or read from the first storage resource in a time duration in which the second storage resource transitions from the non-operating state to an operating state during the writing of the first data.

14. The non-transitory computer-readable recording medium according to claim 13, the process further comprising:
selecting, as the second storage resource, a storage resource associated with a first time slot in storage information, the first time slot including a time at which the write request is received, the storage information associating a plurality of storage resources in the second storage group with respective time slots different from each other.

15. The non-transitory computer-readable recording medium according to claim 13, the process further comprising:
receiving a read request to read the content data;
reading the first data from the first storage resource on basis of content information indicating respective storage locations of the first data and the second data;
reading the second data from the second storage resource on basis of the content information; and
activating, in parallel with the reading of the first data, the second storage resource when the second storage resource is in the non-operating state.

16. The non-transitory computer-readable recording medium according to claim 13, the process further comprising:
transferring, depending on a number of accesses to the second data in a predetermined time duration, the second data stored in the second storage resource to a third storage resource in a third storage group among the plurality of storage groups, the third storage group having a third operating rate lower than the second operating rate.

17. The non-transitory computer-readable recording medium according to claim 16, the process further comprising:
counting a number of accesses to the second data in respective time slots different from each other, the respective time slots being associated in storage information with a plurality of storage resources in the third storage group;

determining a first time slot in which a highest number of accesses to the second data is counted among the time slots; and selecting, as the third storage resource, a storage resource associated with the first time slot on basis of the storage information.

* * * * *